US012393650B2

(12) United States Patent
Chae

(10) Patent No.: US 12,393,650 B2
(45) Date of Patent: Aug. 19, 2025

(54) AUTHENTICATION SYSTEM, AUTHENTICATION DEVICE, AUTHENTICATION METHOD AND PROGRAM

(71) Applicant: Rakuten Group, Inc., Tokyo (JP)

(72) Inventor: Yeongnam Chae, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 94 days.

(21) Appl. No.: 17/057,927

(22) PCT Filed: Jun. 28, 2019

(86) PCT No.: PCT/JP2019/025872
§ 371 (c)(1),
(2) Date: Nov. 23, 2020

(87) PCT Pub. No.: WO2020/261545
PCT Pub. Date: Dec. 30, 2020

(65) Prior Publication Data
US 2024/0256640 A1    Aug. 1, 2024

(51) Int. Cl.
*G06F 21/31* (2013.01)
*G06F 21/44* (2013.01)

(52) U.S. Cl.
CPC .............. *G06F 21/31* (2013.01); *G06F 21/44* (2013.01); *G06F 2221/2103* (2013.01)

(58) Field of Classification Search
CPC . H04L 63/0861; H04L 63/083; H04L 63/205; H04L 2463/082
See application file for complete search history.

(56) References Cited

U.S. PATENT DOCUMENTS

| 2008/0002861 | A1* | 1/2008 | Yano | G06F 21/32 |
| | | | | 382/115 |
| 2010/0250364 | A1* | 9/2010 | Song | H04L 63/102 |
| | | | | 707/758 |
| 2019/0130095 | A1* | 5/2019 | Nakagawa | G06F 21/46 |
| 2019/0286805 | A1* | 9/2019 | Law | G06F 21/34 |

FOREIGN PATENT DOCUMENTS

| JP | 2008-071366 A | 3/2008 |
| TW | 201734907 A | 10/2017 |
| TW | M576696 U | 4/2019 |

OTHER PUBLICATIONS

Communication dated Jun. 15, 2021 by the Taiwanese Patent Office in Taiwanese Application No. 109120327.
International Search Report for PCT/JP2019/025872 dated Sep. 17, 2019 (PCT/ISA/210).

* cited by examiner

*Primary Examiner* — Farid Homayounmehr
*Assistant Examiner* — Brian William Avery
(74) *Attorney, Agent, or Firm* — Sughrue Mion, PLLC

(57) ABSTRACT

Authentication means (101) of an authentication system (S) performs authentication based on input authentication information. Determination means (102) determines, based on the input authentication information, whether there are a plurality of users for which there is a possibility of successful authentication. Input request means (104) requests, when it is determined that there are the plurality of users, input of additional authentication information that is based on a difference in user information on each of the plurality of users. Additional authentication means (105) performs additional authentication based on the input additional authentication information.

17 Claims, 12 Drawing Sheets

FIG.8

| USER ID | NAME | PASSWORD | FACE PHOTOGRAPH | FEATURE AMOUNT OF FACE | PASSCODE | REGISTRATION DATE AND TIME | TELEPHONE NUMBER | EMAIL ADDRESS |
|---|---|---|---|---|---|---|---|---|
| u00001 | A | ******** | aaa.jpg | (a1,a2,a3,·····) | 1427 | 2019/6/20 16:43:51 | 090-1234-5678 | aaa123@mailadd.com |
| u00002 | B | ****** | bbb.jpg | (b1,b2,b3,·····) | 1427 | 2019/3/12 11:20:05 | 080-1876-5234 | 987bbb@abcmail.jp |
| u00003 | C | ******** | ccc.jpg | (c1,c2,c3,·····) | 9128 | 2019/6/5 21:15:41 | 03-9999-1111 | ccc555ccc@xyzfirm.com |
| : | : | : | : | : | : | : | : | : |

DB

AUTHENTICATION SYSTEM, AUTHENTICATION DEVICE, AUTHENTICATION METHOD AND PROGRAM

CROSS REFERENCE TO RELATED APPLICATIONS

This application is a National Stage of International Application No. PCT/JP2019/025872 filed Jun. 28, 2019.

TECHNICAL FIELD

The present invention relates to an authentication system, an authentication device, an authentication method, and a program.

BACKGROUND ART

There has hitherto been known an authentication technology for preventing impersonation by a third party. For example, in Patent Literature 1, there is described a system in which face photographs having a plurality of patterns are registered in advance, and face authentication is executed by using a face photograph having a suitable pattern.

CITATION LIST

Patent Literature

[PTL 1] JP 2008-071366 A

SUMMARY OF INVENTION

Technical Problem

However, in the face authentication described in Patent Literature 1, a determination is performed based on similarity between face photographs having a plurality of patterns registered in advance and the face photograph photographed at the time of authentication. Therefore, when the face of a third party is similar, regardless of the pattern of the face photograph that is used, authentication may be successful. As a result, there are cases in which it is not possible to prevent impersonation by a third party, and security may not be sufficiently enhanced.

The present invention has been made in view of the above-mentioned problem. It is an object of the present invention to provide an authentication system, an authentication device, an authentication method, and a program, which are capable of sufficiently enhancing security.

Solution to Problem

In order to solve the above-mentioned problem, according to one embodiment of the present invention, there is provided an authentication system including: authentication means for performing authentication based on input authentication information; determination means for determining, based on the input authentication information, whether there are a plurality of users for which there is a possibility of successful authentication; input request means for requesting, when it is determined that there are the plurality of users, input of additional authentication information that is based on a difference in user information on each of the plurality of users; and additional authentication means for performing additional authentication based on the input additional authentication information.

According to one embodiment of the present invention, there is authentication provided an system including: first authentication means for performing a first authentication based on similarity between input first authentication information and the registered first authentication information; second authentication means for performing a second authentication based on a match between input second authentication information and the registered second authentication information; determination means for determining whether there are a plurality of users having the registered first authentication information similar to each other, and having the registered second authentication information matching each other; and change request means for requesting, from among the plurality of users, a user determined based on a registration date and time of the second authentication information to change the second authentication information.

According to one embodiment of the present invention, there is provided an authentication device included in the authentication system described above or described below, or an authentication device communicable to and from the authentication system, the authentication device including: transmission means for transmitting information required for the authentication; and processing execution means for executing predetermined processing when the authentication and the additional authentication are successful.

According to one embodiment of the present invention, there is provided an authentication method including the steps of: performing authentication based on input authentication information; determining, based on the input authentication information, whether there are a plurality of users for which there is a possibility of successful authentication; requesting, when it is determined that there are the plurality of users, input of additional authentication information that is based on a difference in user information on each of the plurality of users; and performing additional authentication based on the input additional authentication information.

According to one embodiment of the present invention, there is provided a program for causing a computer to function as: authentication means for performing authentication based on input authentication information; determination means for determining, based on the input authentication information, whether there are a plurality of users for which there is a possibility of successful authentication; input request means for requesting, when it is determined that there are the plurality of users, input of additional authentication information that is based on a difference in user information on each of the plurality of users; and additional authentication means for performing additional authentication based on the input additional authentication information.

According to one aspect of the present invention, the authentication system further includes generation means for identifying a difference in the user information on each of the plurality of users, and generating the additional authentication information, and the additional authentication means is configured to perform the additional authentication based on the input additional authentication information and the generated additional authentication information.

According to one aspect of the present invention, the generation means is configured to generate the additional authentication information such that an input amount of the additional authentication information falls within a fixed range.

According to one aspect of the present invention, the user information includes a plurality of items, a priority order is defined for each of the plurality of items, and the generation means is configured to generate the additional authentication information based on the priority order of each of the plurality of items.

According to one aspect of the present invention, the user information includes a plurality of information portions, a priority order is defined for each of the plurality of information portions, and the generation means is configured to generate the additional authentication information based on the priority order of each of the plurality of information portions.

According to one aspect of the present invention, the authentication means is configured to perform the authentication based on similarity between the input authentication information and the registered authentication information, and each of the plurality of users is a user for which the input authentication information is similar to the registered authentication information.

According to one aspect of the present invention, the authentication means is configured to perform a first authentication based on similarity between input first authentication information and registered first authentication information, the authentication system further includes means for performing a second authentication based on a match between input second authentication information and the registered second authentication information, and each of the plurality of users is a user for which the input first authentication information is similar to the registered first authentication information, and for which the input second authentication information matches the registered second authentication information.

According to one aspect of the present invention, the authentication system further includes change request means for requesting, from among the plurality of users, a user determined based on a registration date and time of the second authentication information to change the second authentication information.

According to one aspect of the present invention, the first authentication information is biometric authentication information, the first authentication is biometric authentication, the second authentication information is a passcode having a predetermined number of digits, the second authentication is passcode authentication, and each of the plurality of users is a user for which the input biometric authentication information is similar to the registered biometric authentication information, and for which the input passcode matches the registered passcode.

According to one aspect of the present invention, the authentication means is configured to determine whether there is similarity based on a first standard relating to the similarity, and the determination means is configured to determine whether there is similarity based on a second standard that is lower than the first standard.

According to one aspect of the present invention, the input request means is configured to request, based on a predetermined condition, even when it is determined that there are not the plurality of users, input of a part or all of user information on a user for which the authentication is successful, and the additional authentication means is configured to perform the additional authentication based on the input part or all of the user information.

According to one aspect of the present invention, the authentication system further includes processing execution means for executing, when the authentication and the additional authentication are successful, payment processing based on payment information on a user for which the authentication and the additional authentication are successful.

Advantageous Effects of Invention

According to the present invention, it is possible to enhance security sufficiently.

BRIEF DESCRIPTION OF DRAWINGS

FIG. 8 is a table for showing a data storage example of a user database.

DESCRIPTION OF EMBODIMENTS

1. First Embodiment

There is now described an example of an authentication system according to a first embodiment of the present invention (hereinafter referred to as "first embodiment").

[1-1. Overall Configuration of Authentication System]

Figure 1:
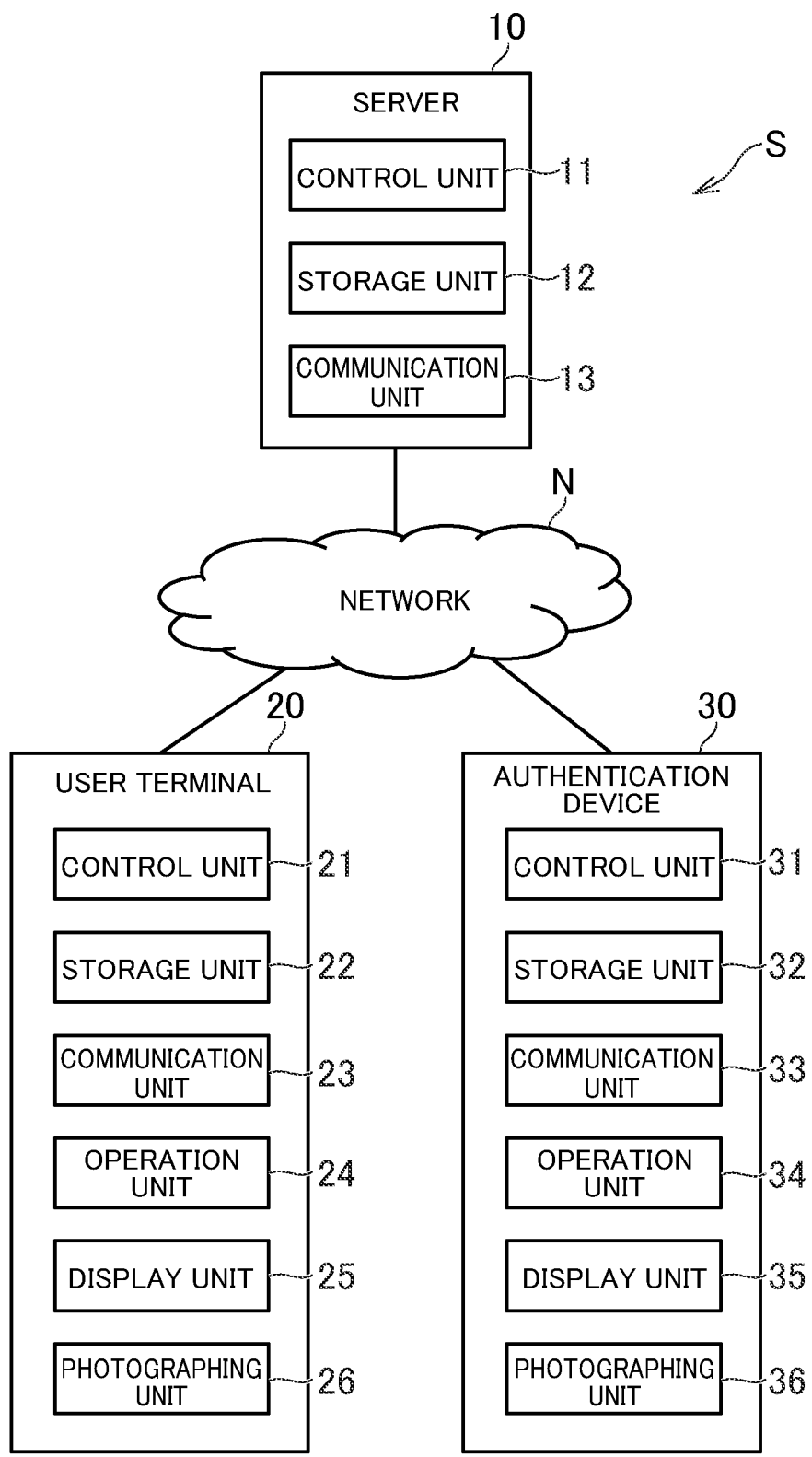
FIG. 1 is a diagram for illustrating an overall configuration of an authentication system according to a first embodiment of the present invention.

FIG. 1 is a diagram for illustrating an overall configuration of the authentication system of the first embodiment. As illustrated in FIG. 1, an authentication system S includes a server 10, a user terminal 20, and an authentication device 30, each of which can be connected to a network N, for example, the Internet. In FIG. 1, there is illustrated one server 10, one user terminal 20, and one authentication device 30, but there may be a plurality of each of those.

The server 10 is a server computer. The server 10 includes a control unit 11, a storage unit 12, and a communication unit 13. The control unit 11 includes at least one processor. The control unit 11 executes processing in accordance with programs and data stored in the storage unit 12. The storage unit 12 includes a main memory unit and an auxiliary memory unit. For example, the main memory unit is a volatile memory, for example, a RAM, and the auxiliary memory unit is a non-volatile memory such as a ROM, an EEPROM, a flash memory, or a hard disk drive. The communication unit 13 is a communication interface for wired communication or wireless communication, and performs data communication via the network N.

The user terminal 20 is a computer to be operated by a user. For example, the user terminal 20 is a cell phone (including smartphones), a portable information terminal (including tablet computers and wearable terminals), or a personal computer. In this embodiment, the user terminal 20 includes a control unit 21, a storage unit 22, a communication unit 23, an operation unit 24, a display unit 25, and a photographing unit 26. The physical configuration of each of the control unit 21, the storage unit 22, and the communication unit 23 may be the same as those of the control unit 11, the storage unit 12, and the communication unit 13, respectively.

The operation unit 24 is an input device, and is, for example, a pointing device such as a touch panel and a mouse, a keyboard, or a button. The operation unit 24 transmits details of operation to the control unit 21. The display unit 25 is, for example, a liquid crystal display unit or an organic EL display unit. The display unit 25 displays an image in accordance with an instruction of the control unit 21.

The photographing unit 26 includes at least one camera. For example, the photographing unit 26 includes an image pickup element such as a CCD image sensor or a CMOS image sensor, and records an image picked up by the image pickup element as digital data. The image may be a still image or a moving image picked up continuously at a predetermined frame rate.

The authentication device 30 is a computer to be used for authentication. For example, the authentication device 30 is a cell phone, a portable information terminal, or a personal computer. In this embodiment, the authentication device 30 includes a control unit 31, a storage unit 32, a communication unit 33, an operation unit 34, a display unit 35, and a photographing unit 36. The physical configuration of each of the control unit 31, the storage unit 32, the communication unit 33, the operation unit 34, the display unit 35, and the photographing unit 36 may be the same as those of the control unit 11, the storage unit 12, the communication unit 13, the operation unit 24, the display unit 25, and the photographing unit 26, respectively.

Programs and data to be described as being stored into the storage units 12, 22, and 32 may be supplied thereto via the network N. Further, the respective hardware configurations of the computers described above are not limited to the above-mentioned examples, and various types of hardware can be applied thereto. For example, the hardware configuration may include a reading unit (e.g., an optical disc drive or a memory card slot) configured to read a computer-readable information storage medium, or an input/output unit (e.g., a USB port) configured to input and output data to/from an external device. For example, the program and the data stored in the information storage medium may be supplied to each of the computers through intermediation of the reading unit or the input/output unit.

[1-2. Outline of Authentication System]

The authentication system S is configured to execute authentication in order to confirm the validity of the user in a suitable situation. The authentication is an action of confirming whether or not the user has a predetermined qualification, and may be referred to as "other-party authentication" or "personal authentication". The authentication system S can execute various types of authentication. For example, the authentication system S can execute biometric authentication, passcode authentication, password authentication, electronic stamp authentication, or countersign authentication.

Biometric authentication is an authentication method that uses a physical feature or behavioral characteristic of a human. Examples of biometric authentication that uses a physical feature includes face authentication, fingerprint authentication, DNA authentication, palm authentication, retina authentication, iris authentication, vein authentication, and voice authentication. Examples of biometric authentication that uses a behavioral feature include handwriting authentication, key stroke authentication, lip movement authentication, eye blinking authentication, and gait authentication.

In this embodiment, processing of the authentication system S is described by using a situation in which the user passes through a security gate as an example. The authentication system S is applicable to various situations, as described in modification examples of the present invention later, and the situations to which the authentication system S is applied are not limited to the example of this embodiment.

Figure 2:
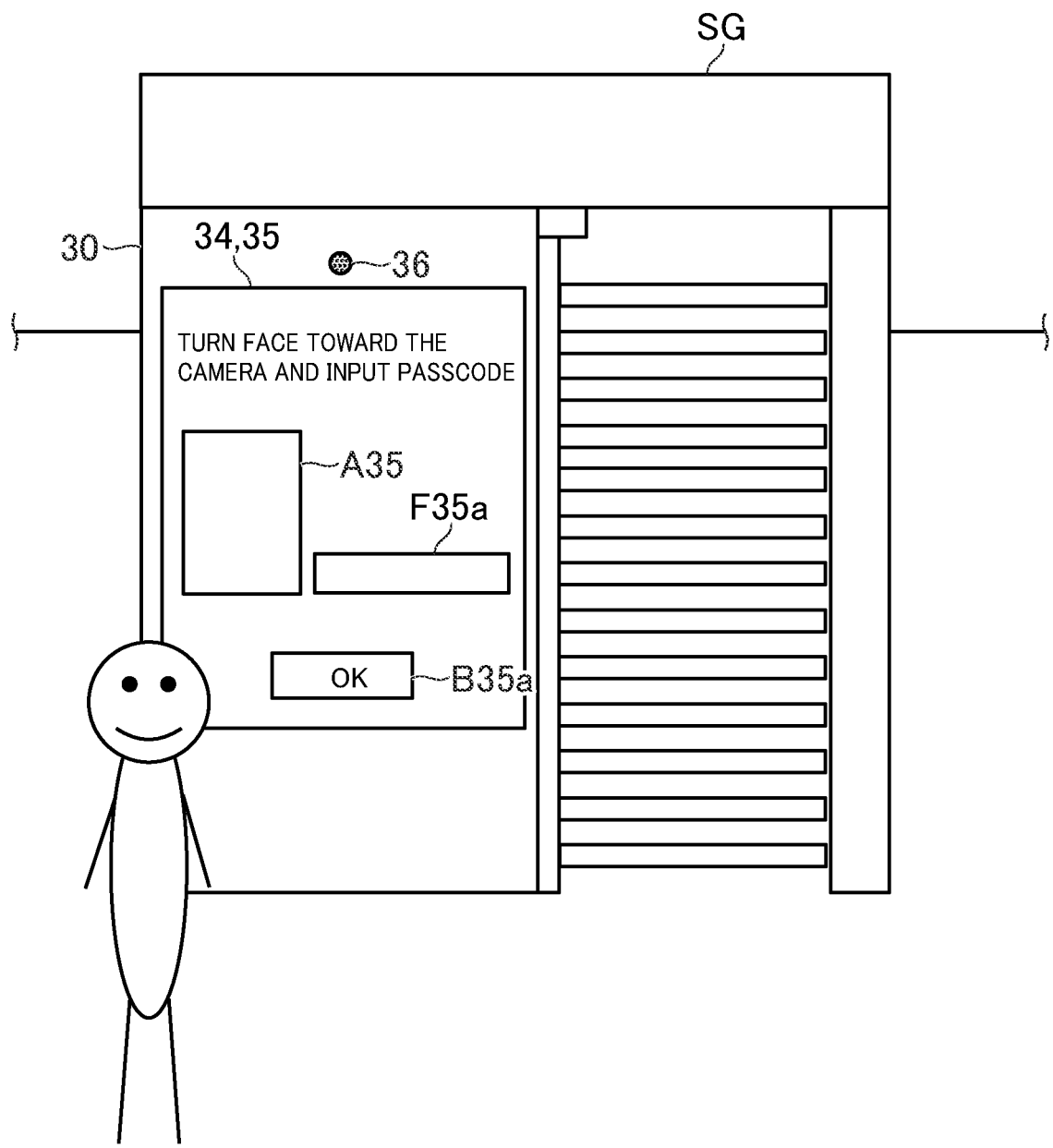
FIG. 2 is a diagram for illustrating an example of a situation in which the authentication system is used.

FIG. 2 is a diagram for illustrating an example of a situation in which the authentication system S is used. As illustrated in FIG. 2, a security gate SG includes a rotatable door, and is connected to the authentication device 30. The door of the security gate SG is locked by a lock mechanism, and is unlocked when user authentication is successful. When the lock is unlocked, the user can push the door to pass through the door. The door is locked again when the door is rotated by a predetermined angle. The door may be an opening and closing type of door, and the opening and closing may be controlled by an electronic lock.

For example, the security gate SG may be arranged at any facility, such as at a company for which the user works or at a public facility, and only those who are qualified to enter are allowed to pass through the security gate SG. In general, security gates using a card key are generally used, but when the user loses the card key, a third party who has acquired the card key may impersonate the user to pass through the security gate.

In this regard, when biometric authentication is used, unlike a card key, there is no risk of not being able to use biometric authentication. However, as described in the "background art" section, biometric authentication does not require an exact match of the face or the like, and whether or not authentication is successful is determined based on similarity. Therefore, for example, another person having a face similar to that of the user may impersonate the user to pass through the security gate.

In this regard, when two-step authentication is performed by combining biometric authentication with another authentication, for example, passcode authentication, security is improved as compared with a case in which only face authentication is used. However, a passcode is a relatively short piece of information (for example, a four-digit number), and a plurality of users having a similar face to each other may accidentally use the same passcode. In this case, there is a possibility that a certain user A is authenticated as another user B having a similar face and using the same passcode, and the user A passes through the security gate by impersonating the user B.

Therefore, when a plurality of users having a similar face to each other are each using the same passcode, the authentication system S prevents impersonation like the impersonation described above by performing additional authentication based on a difference in user information, for example, a telephone number or an email address.

Additional authentication is authentication performed in addition to normal authentication. Normal authentication is authentication performed every time for all users, and additional authentication is authentication performed for a specific user or is authentication not performed every time. Additional authentication is performed less frequently than normal authentication, and is performed after normal authentication. In this embodiment, there is described a case in which normal authentication is two-step authentication combining biometric authentication and passcode authentication, and when additional authentication is performed, a total of three steps of authentication is performed. The number of steps of authentication is not limited to the example of this embodiment, and may be any number of steps. For example, normal authentication may be one step, or may be three or more steps. Similarly, two or more steps of additional authentication may be performed.

The user information is information on the user. In other words, the user information is information registered by the user in the authentication system S. The authentication information may be any information on the user, but in this embodiment, the user information is information different from the authentication information. For example, the user information may be user identification information for uniquely identifying the user, personal information on the user, payment information on the user, or preference information on the user. In this embodiment, there is described a case in which personal information on the user corresponds to the user information, and as an example, a telephone number and an email address are described. For this reason, in this embodiment, the terms "telephone number" and "email address" may be read as "user information". The user information is not limited to a telephone number or an email address, and may be other information, for example, a name, an address, a date of birth, or a nickname.

In this embodiment, the user performs predetermined use registration when using the authentication service provided by the authentication system S. The user registration may be performed not by the user, but by applying for use registration on a document and registering the user information by an operation of an operator or the like. For example, when a new user who has not performed use registration accesses the server 10 by operating the user terminal 20, a registration application screen for performing use registration is displayed on the display unit 25 of the user terminal 20.

Figure 3:
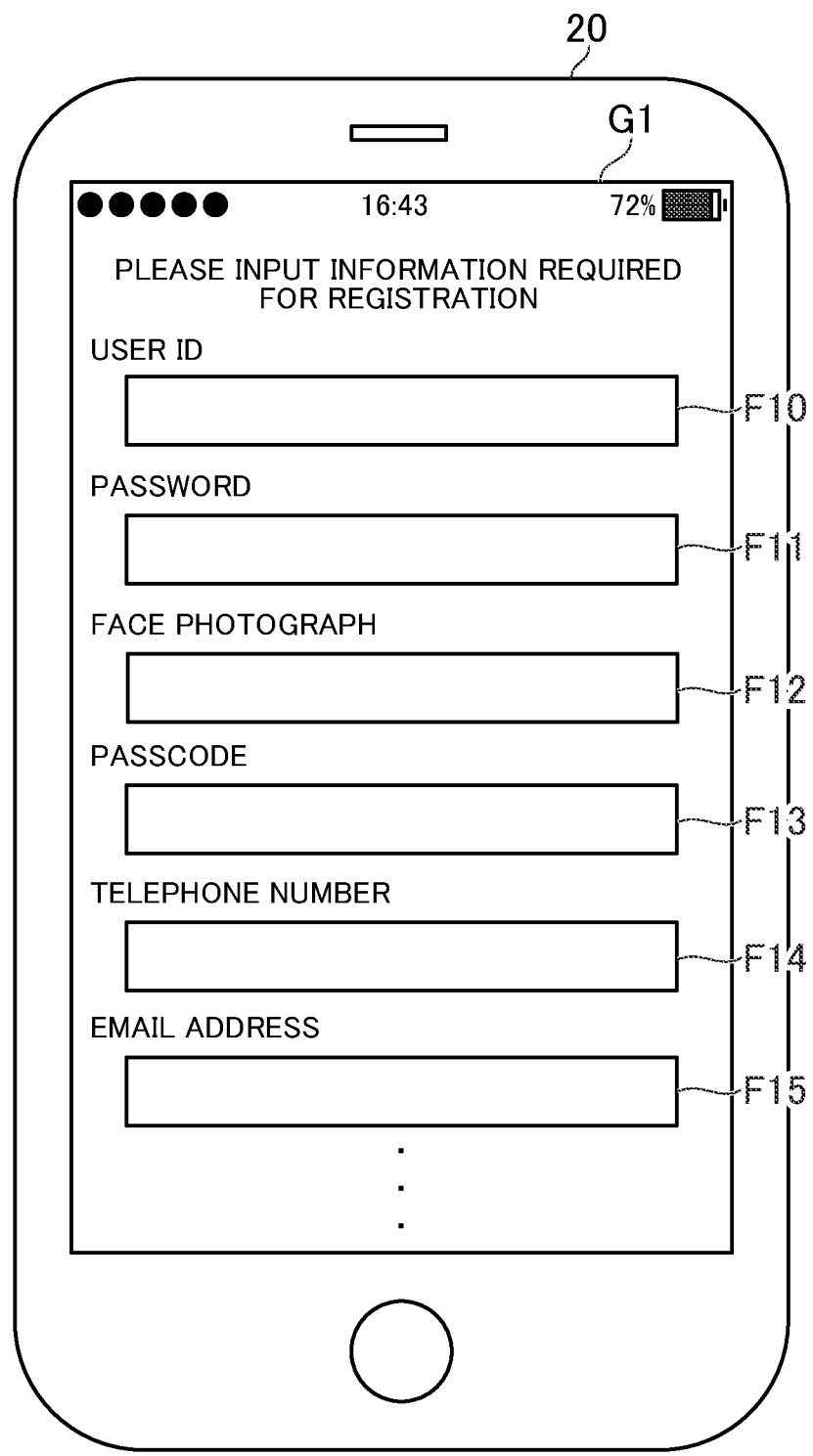
FIG. 3 is a diagram for illustrating an example of a registration application screen.

FIG. 3 is a diagram for illustrating an example of a registration application screen. The registration application screen is a screen for a user to apply for use registration. As illustrated in FIG. 3, on a registration application screen G1, an input form F10 for inputting a desired user ID, an input form F11 for inputting a password, an input form F12 for uploading a face photograph, an input form F13 for inputting a passcode, an input form F14 for inputting a telephone number, an input form F15 for inputting an email address, and the like are displayed.

The user ID is an example of the user identification information, and may be referred to as "user account". The password is a symbol string having any length specified by the user, and is information different from the passcode described above. "Symbol" refers to both numbers and letters. In this embodiment, the password is not used in order to pass through the security gate SG, but is used for another purpose, for example, changing the registration information on the user.

In this embodiment, a user who has stored his or her face photograph in the storage unit 22 of the user terminal 20 inputs a file name of the face photograph into the input form F12, and specifies the face photograph to be uploaded. That is, the user specifies in the input form F12 the face photograph to be used for face authentication. In order to simplify the description, there is described a case in which only one face photograph is registered, but a plurality of face photographs may be registered. The user may also activate the photographing unit 26 to photograph a face photograph on the spot.

In this embodiment, there is described a case in which the user inputs a 4-digit passcode into the input form F13, but the passcode may have any number of digits. For example, the passcode may have one to three digits or five or more digits. Further, for example, the number of digits of the passcode may be the same for all users, or a passcode having a freely-set number of digits may be set for each user. When the user inputs information into each of the input forms F10 to F15 and performs a predetermined operation, use registration is completed, and a registration completion screen is displayed on the display unit 25.

Figure 4:
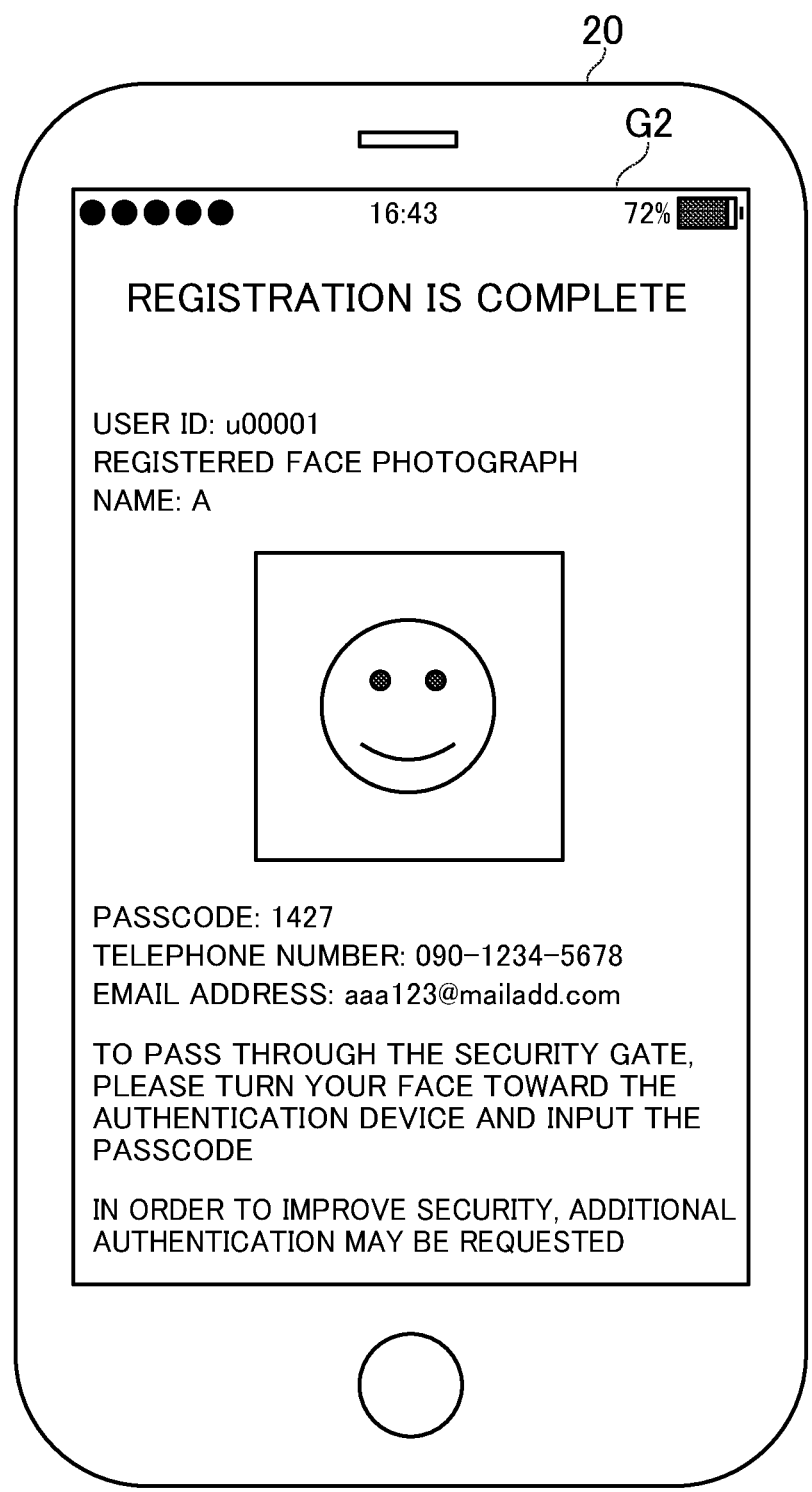
FIG. 4 is a diagram for illustrating an example of a registration completion screen.

FIG. 4 is a diagram for illustrating an example of a registration completion screen. As illustrated in FIG. 4, on a registration completion screen G2, a message indicating that use registration has been completed, and the user ID, name, face photograph, passcode, telephone number, and email address of the user who performed the registration application are displayed. When the use registration is complete, the user can receive an authentication service for passing through the security gate SG.

Figure 5:
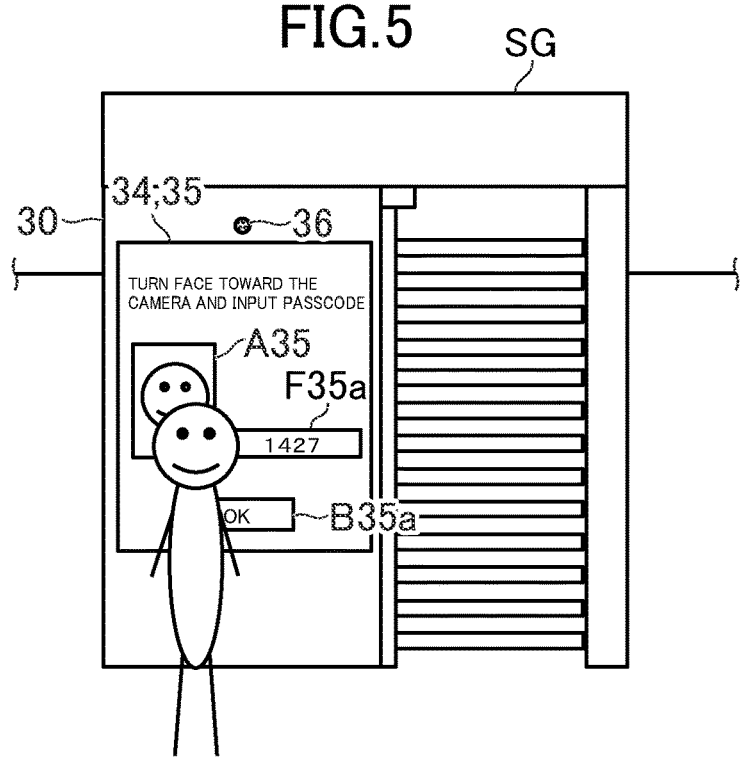
FIG. 5 is a diagram for illustrating a situation in which a user passes through a security gate.
Figure 5:
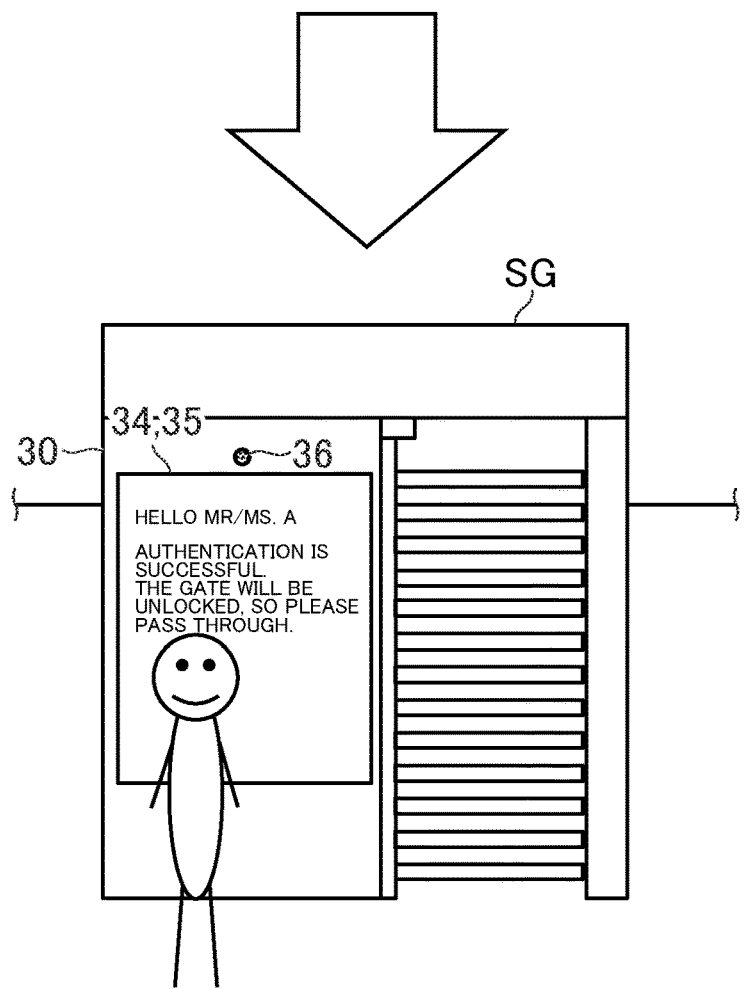

FIG. 5 is a diagram for illustrating how a user passes through the security gate SG. As illustrated in FIG. 5, the user causes the photographing unit 36 to photograph his or her face in accordance with guidance displayed on the display unit 35 of the authentication device 30. For example, an image photographed by the photographing unit 36 is displayed in a display area A35 of the display unit 35. The user operates the operation unit 34 to input his or her passcode into an input form F35a displayed on the display unit 35.

When the user selects a button B35a, the image photographed by the photographing unit 36 and the passcode input to the input form F35a are transmitted to the server 10, and face authentication and passcode authentication are executed. As illustrated in FIG. 5, when those two authentications are successful, the security gate SG is unlocked, and the user can pass through the security gate SG.

Meanwhile, when another user having a similar face is using the same passcode, there is a possibility that the user is authenticated as the another user, and the user in front of the security gate SG passes through the gate by impersonating the another user. For this reason, in this embodiment, additional authentication is performed by requesting the user to input, of the telephone number or the email address, a portion different from the another user who has a similar face and is using the same passcode.

Figure 6:
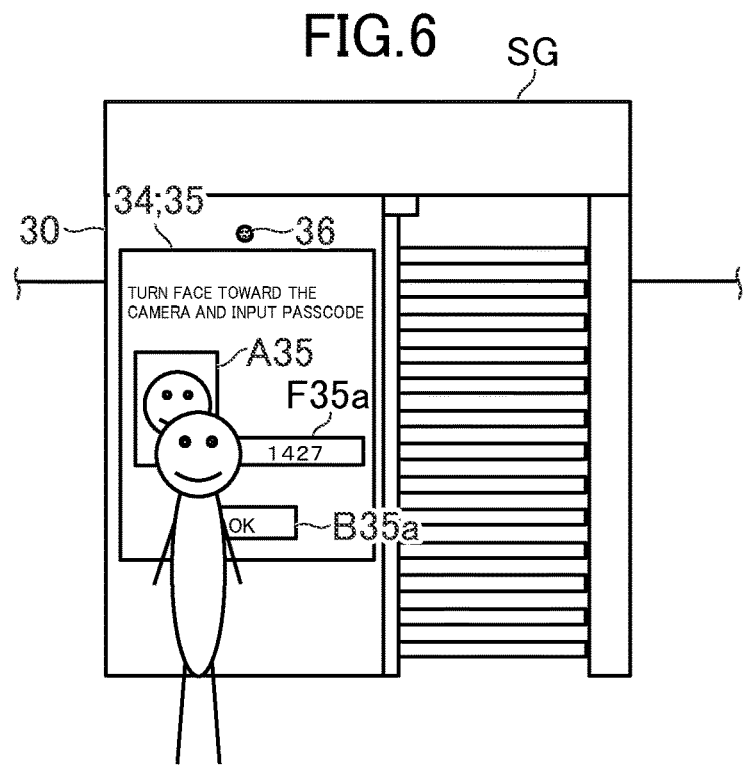
FIG. 6 is a diagram for illustrating a situation in which additional authentication is performed.
Figure 6:
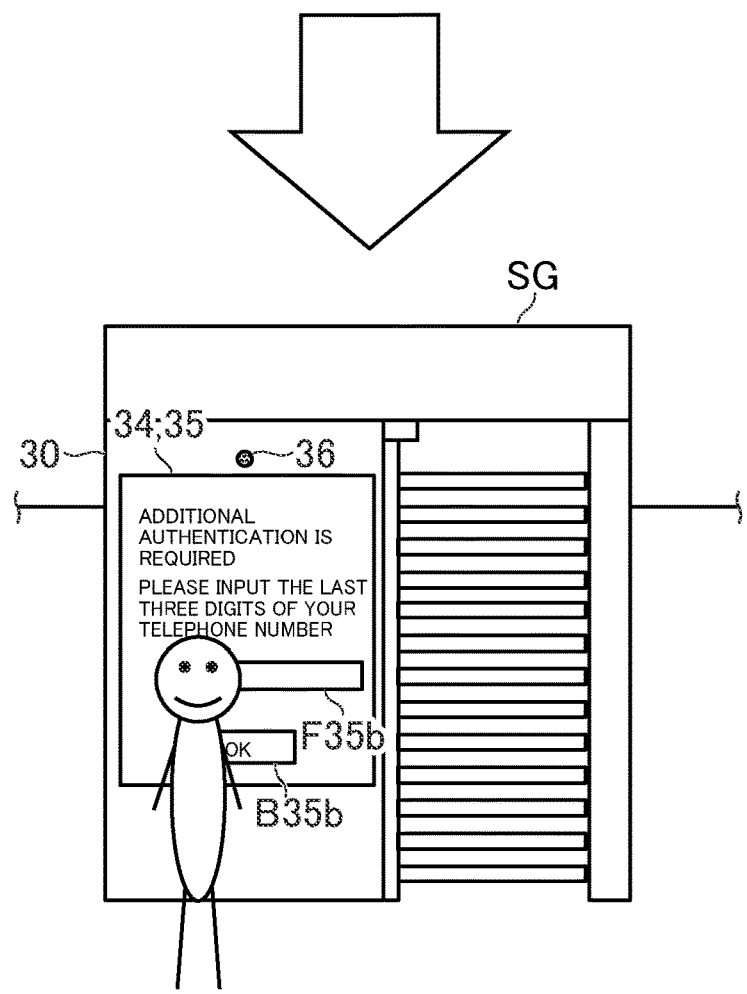

FIG. 6 is a diagram for illustrating a situation in which additional authentication is performed. As illustrated in FIG. 6, when another user having a similar face is using the same passcode, a message indicating that additional authentication is to be performed is displayed on the display unit 35 of the authentication device 30. In this case, there are a plurality of users for which face authentication and passcode authentication has been successful, and the user who is attempting to pass through the security gate SG is identified by additional authentication. The security gate SG remains locked until additional authentication is successful.

As illustrated in FIG. 6, the content to be input by the user in additional authentication is displayed on the display unit 35. In this embodiment, in additional authentication, it may be required to input a part of the telephone number or to input a part of the email address. In the example of FIG. 6, the last three digits of the telephone number of the user attempting to pass through the security gate SG are different from those of another user having a similar face and using the same passcode. Therefore, in additional authentication, it is required to input the last three digits of the telephone number in order to identify who is attempting to pass through the security gate SG.

The user follows the additional authentication guidance displayed on the display unit 35 and inputs the last three digits of his or her telephone number into an input form F35*b*. When the user selects a button B35*b*, the last three digits of the telephone number input to the input form F35*b* are transmitted to the server 10, and additional authentication is executed. When the additional authentication is successful, the security gate SG is unlocked, and the user can pass through the security gate SG.

When the information required for additional authentication is too complicated, the user may not be able to remember the information or may input the information incorrectly. For this reason, in additional authentication, in order to increase usability, relatively simple information is required to be input. Meanwhile, when the information required for additional authentication is too simple, security is reduced, and therefore a certain amount of information is required to be input. There is a tradeoff between ease of additional authentication and security, and therefore in this embodiment, for example, about a two to four-digit number or symbol is required to be input in order to achieve this balance.

As described above, when a plurality of users having a similar face to each other are using the same passcode, the authentication system S of this embodiment sufficiently enhances security by requesting input of a portion of the telephone number or email address that is different among the plurality of users to perform additional authentication.

[1-3. Functions to be Implemented by Authentication System]

Figure 7:
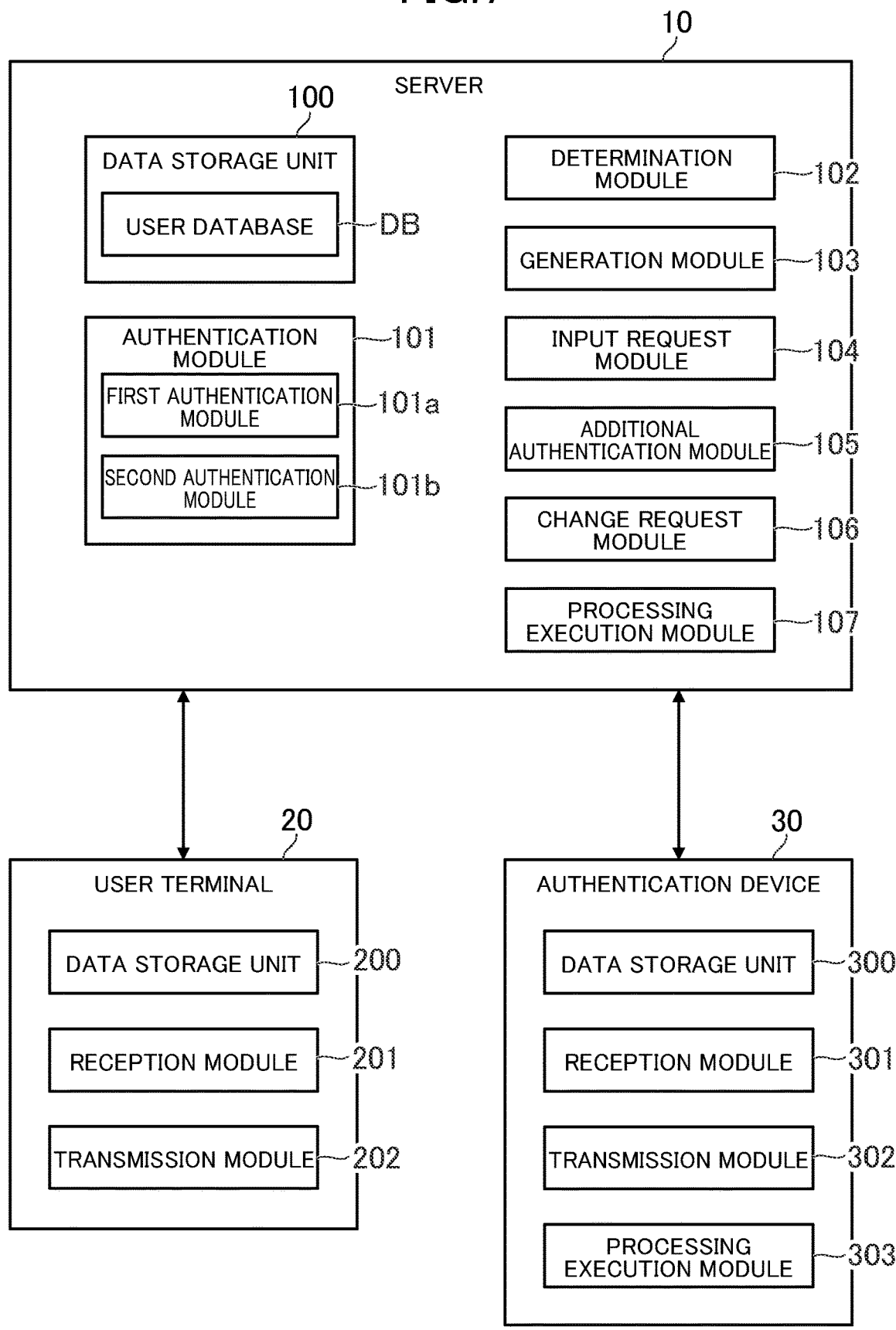
FIG. 7 is a functional block diagram for illustrating an example of functions to be implemented in this embodiment.

FIG. 7 is a functional block diagram for illustrating an example of functions to be implemented by the authentication system S of this embodiment. In this example, the functions to be implemented by each of the server 10, the user terminal 20, and the authentication device 30 are described.

[1-3-1. Functions to be Implemented by Server]

As illustrated in FIG. 7, in the server 10, a data storage unit 100, an authentication module 101, a determination module 102, a generation module 103, an input request module 104, an additional authentication module 105, a change request module 106, and a processing execution module 107 are implemented.

[Data Storage Unit]

The data storage unit 100 is mainly implemented by the storage unit 12. The data storage unit 100 is configured to store the data required for authentication. As an example of the data stored in the data storage unit 100, there is described a user database DB, in which various types of information relating to the user are stored.

FIG. 8 is a table for showing a data storage example of the user database DB. As shown in FIG. 8, the user database DB stores a user ID, a user name, a password, data of an uploaded face photograph, a face feature amount calculated from the face photograph, a passcode, a registration date and time of the passcode, a telephone number, an email address, and the like. Those pieces of information stored in the user database DB are examples of the user information.

For example, when the user performs use registration, a new record is created in the user database DB. The new record stores the name, password, passcode, registration date and time of the passcode, telephone number, email address, face photograph, and feature amount calculated based on the face photograph in association with the user ID. When the user does not specify the user ID, the server 10 issues a new user ID.

The password, the face feature amount, and the passcode stored in the user database DB are a kind of authentication information. The telephone number and the email address may also be used in additional authentication, and therefore can be said to be a kind of authentication information.

The authentication information is information to be referred to during authentication. The authentication information can also be said to be information serving as a correct answer or an index during authentication. The name of the authentication information varies depending on the authentication method. For example, in the case of electronic stamp authentication, a multi-touch pattern of the stamp is the authentication information, and in the case of countersign authentication, the countersign is the authentication information. The authentication information may be used for any purpose. In this embodiment, the password is used in order for the user to perform a registration application or edit registered information, and the feature amount of the face, the passcode, the telephone number, and the email address are used in order for the user to pass through the security gate. The face photograph may also correspond to the authentication information.

The feature amount of the face is information obtained by quantifying a feature of the face, and indicates features such as a relative position, size, or shape of a facial part. In this embodiment, the feature amount of the face indicated by the face photograph is calculated in advance, but the feature amount of the face may be calculated on the spot at the time of authentication. When a plurality of face photographs are to be registered, the feature amount of the face is calculated for each face photograph. Various methods are applicable for the actual face authentication. For example, a method such as principal component analysis, linear discriminant analysis, elastic matching, or hidden Markov model is usable, and the feature amount is only required to be calculated by a calculation expression corresponding to those methods. For example, the feature amount of the face is assumed to be represented by a multi-dimensional vector, but it may be represented in another form, such as an array or a single numerical value.

As described above, the passcode is a number having a predetermined number of digits that is used for authentication. The passcode is sometimes referred to as "personal identification number (PIN)" or "code number". The passcode and the password are similar concepts, but differ in that the passcode is composed of only numbers, whereas the password may be composed of any kind of symbol. In this embodiment, the passcode has a fixed number of digits, whereas the password can be set to have any number of digits. It is not required that the number of digits of the passcode be determined.

The information stored in the user database DB is not limited to the example of FIG. 8, and any information on the user may be stored. For example, any user information, for example, the user's date of birth, address, credit card number, or bank account number, may be stored in the user database DB.

[Authentication Module]

The authentication module 101 is mainly implemented by the control unit 11. The authentication module 101 is configured to perform authentication based on the input authentication information. In this embodiment, the authentication information is registered in the user database DB in advance, and the authentication module 101 performs authentication based on the input authentication information and the registered authentication information.

The input authentication information is the authentication information input to the computer during authentication. In other words, the input authentication information can be said to be the information to be compared with the registered authentication information or the information to serve as a query during authentication. The input authentication information may be authentication information input through a user operation, or authentication information input based on a detection result of a sensor, for example, the photographing unit 36. In this embodiment, the feature amount of the face indicated by the photographed image of the photographing unit 36, the passcode input to the input form F35, and a part of each of the telephone number or the email address input to the input form F35b are examples of the input authentication information.

The registered authentication information is authentication information registered in advance, and is authentication information that may be a correct answer during authentication. In other words, the registered authentication information is information to be compared with the input authentication information, and is information serving as an index during authentication. In this embodiment, the feature amount of the face, the passcode, the telephone number, the email address stored in the user database DB are each an example of the registered authentication information.

For example, the authentication module 101 performs authentication by determining whether or not the input authentication information matches or is similar to the registered authentication information. When the input authentication information and the registered authentication information do not match or are not similar, the authentication module 101 determines that authentication is not successful, and when the input authentication information and the registered authentication information match or are similar, the authentication module 101 determines that authentication is successful.

A "match" means that the input authentication information and the registered authentication information are the same. In this example, "match" means a complete match, and not a partial match. For this reason, in a case in which it is determined that the authentication information matches, when the authentication information is even partially different, authentication is not successful. For example, in password authentication, a match between passwords is determined.

A term "similar" refers to whether or not the input authentication information is similar to the registered authentication information. In other words, similarity is the difference or the discrepancy between the input authentication information and the registered authentication information. For example, in biometric authentication, the similarity between pieces of biological authentication information is determined. In biometric authentication, authentication information converted into a feature amount is used, and therefore when a difference (distance) between feature amounts is less than a threshold value, the authentication information is determined to be similar, and when the difference is equal to or more than the threshold value, the authentication information is determined not to be similar.

In this embodiment, there is described a case in which the authentication module 101 includes a first authentication module 101a and a second authentication module 101b, and two-step authentication is executed by using both a match and similarity of the authentication information. However, the authentication module 101 may be configured to perform one-step authentication, in which authentication is performed by using only one of a match and similarity of the authentication information. In this case, it is not required that the authentication module 101 be separated into the first authentication module 101a and the second authentication module 101b.

[First Authentication Module]

The first authentication module 101a is configured to perform first authentication based on the similarity between the input first authentication information and the registered first authentication information.

The first authentication information is the authentication information to be used in the first authentication. The first authentication is authentication based on the similarity of the authentication information. In the first authentication, a similarity degree is calculated based on the input authentication information and the registered authentication information. The similarity degree is an index indicating the degree of similarity. In other words, the similarity degree is an index indicating the size of the difference or discrepancy between the pieces of authentication information. When the similarity degree is higher, the pieces of authentication information are more similar to each other, and when the similarity degree is lower, the pieces of authentication information are less similar to each other. The similarity degree can also be said to be the probability that the authentication information is similar. The similarity degree may be indicated as a percentage between 0% and 100%, or as another numerical value, for example, a distance in a vector space.

In this embodiment, as an example, there is described a case in which the first authentication information is biometric authentication information and the first authentication is biometric authentication. Further, the feature amount of the face is described as a specific example of the biometric authentication information, and face authentication is described as a specific example of biometric authentication. For this reason, in this embodiment, the expression "feature amount of the face" may be read as "first authentication information" or "biometric authentication information", and the expression "face authentication" may be read as "first authentication" or "biometric authentication".

The first authentication module 101a performs face authentication based on the similarity between the input feature amount of the face and the registered feature amount of the face. For example, when the face of the user is to be photographed by the authentication device 30, the first authentication module 101a calculates the input feature amount of the face based on the image photographed by the authentication device 30. The first authentication module 101a also refers to the user database DB to acquire the registered feature amount of the face. When the input feature amount of the face and the registered feature amount of the face are similar, the first authentication module 101a determines that authentication is successful, and determines that authentication has failed when the input feature amount of the face and the registered feature amount of the face are not similar.

The first authentication module 101a may use a reciprocal number of a difference between those feature amounts (e.g., distance between vectors indicated by each feature amount) as the similarity degree, or may calculate the similarity degree by substituting those feature amounts into a predetermined calculation formula (e.g., a calculation formula weighted for each element of the vectors indicated by the feature amounts). In this embodiment, when the difference in feature amounts is smaller, the similarity degree is higher, and when the difference in feature amounts is larger, the similarity degree is lower. The first authentication module 101a determines that authentication is successful when the similarity degree is equal to or more than a threshold value, and determines that authentication has failed when the similarity degree is less than the threshold value.

When the face photograph itself is used as the first authentication information in place of the feature amount of the face, the first authentication module 101a may calculate the similarity degree between an input face photograph and a registered face photograph. Various methods are applicable as the method of calculating the similarity degree between the input face photograph and the registered face photograph. For example, a method of calculating a difference between pixel values of pixels in the images may be used, or the similarity degree calculation used in machine learning may be used.

In this embodiment, the first authentication module 101a determines whether or not there is similarity based on a first standard relating to similarity.

The standard relating to similarity is a standard for determining whether or not authentication based on similarity is successful. In other words, the standard relating to similarity is a threshold value indicating what degree of similarity is required in order for authentication to be successful or to fail. When the success or failure of authentication is determined based on the similarity degree as in this embodiment, the standard is the threshold value of the similarity degree. The first standard is a stricter standard than a second standard described later. A strict standard is a standard under which authentication is difficult to succeed. When a similarity degree is used as in this embodiment, the first standard is a threshold value of the similarity degree, and is a threshold value larger than the second standard described later.

The first authentication module 101a determines that there is similarity when the first standard is satisfied, and determines that there is not similarity when the first standard is not satisfied. Satisfying the first standard means that the similarity degree is equal to or more the threshold value, and not satisfying the first standard means that the similarity degree is less than the threshold value. For example, the first authentication module 101a determines that there is similarity when the calculated similarity degree is equal to or more than the first threshold value, and determines that there is not similarity when the similarity degree is less than the first threshold value.

In face authentication, which is the first authentication, all the feature amounts of the faces registered in the user database DB may be compared. However, in this embodiment, the first authentication module 101a extracts, from among the feature amounts of the faces registered in the user database DB, the feature amount of the face of the user matching the input passcode. Specifically, in this embodiment, passcode authentication, which is the second authentication, is executed first, and after the feature amounts of the faces to be compared have been narrowed down by the first authentication, biometric authentication, which is the first authentication, is executed.

The first authentication module 101a uses the extracted feature amount of the face in the user database DB as the feature amount to be compared with the input feature amount of the face. Specifically, the first authentication module 101a uses a record in the user database DB matching the input passcode as the feature amount to be compared with the input feature amount of the face. Further, the user may be requested to input his or her user ID or name during authentication. In this case, the first authentication module 101a may use only the feature amount of the face associated with the input user ID or name as the comparison target.

[Second Authentication Module]

The second authentication module 101b is configured to perform second authentication based on the match between the input second authentication information and the registered second authentication information.

The second authentication information is the authentication information to be used in the second authentication. The second authentication is authentication based on matching of pieces of the authentication information. In this embodiment, as an example, there is described a case in which the second authentication information is a passcode having a predetermined number of digits and the second authentication is passcode authentication. Therefore, the term "passcode" in this embodiment may be read as "second authentication information", and the term "passcode authentication" may be read as "second authentication".

The second authentication module 101b performs passcode authentication based on a match between an input passcode and a registered passcode. The second authentication module 101b determines that authentication is successful when the input passcode and the registered passcode match, and determines that authentication has failed when the input passcode and the registered passcode do not match.

In this embodiment, passcode authentication is executed first in order to narrow down the feature amounts of the faces to be compared in face authentication, and therefore all of the passcodes registered in the user database DB are compared. For this reason, the second authentication module 101b identifies all records storing a passcode matching the input passcode. The second authentication module 101b determines that authentication has failed when no records matching the input passcode are found, and determines that the authentication is successful when even one record matching the input passcode is found. The feature amount of the face stored in the record that is found when authentication is successful is the feature amount to be compared in face authentication.

Contrary to this embodiment, biometric authentication, which is the first authentication, may be executed first, and passcode authentication, which is the second authentication, may be executed later. In this case, all the feature amounts of the faces registered in the user database DB are compared in biometric authentication, and the passcodes to be compared in passcode authentication are narrowed down. In this case, only the passcodes stored in the records for which biometric authentication is determined to be successful are compared in passcode authentication.

[Determination Module]

The determination module 102 is mainly implemented by the control unit 11. The determination module 102 is configured to determine, based on the input authentication information, whether or not there are a plurality of users for which there is a possibility of successful authentication.

A user for which there is the possibility of successful authentication is a user for which the input authentication information matches or is similar to the registered authentication information. In other words, a user for which there is the possibility of successful authentication is a user for which there is the possibility that the input authentication information satisfies the standard for successful authentication. The determination module 102 determines, based on the input authentication information and the user database DB, whether or not there are a plurality of users for which there is the possibility of successful authentication.

For example, at the time of determining whether or not authentication is successful based on the similarity of the authentication information, each of the plurality of users is a user for which the input authentication information is similar to the registered authentication information. The determination module 102 determines whether or not there are a plurality of records in the user database DB in which the input authentication information and the registered authentication information are similar. The presence of a plurality of such records means that there are a plurality of users for which there is the possibility of successful authentication.

Further, for example, when the determination as to whether or not authentication is successful is performed based on matching of pieces of authentication information, each of the plurality of users for which there is the possibility of successful authentication is a user for which the input authentication information matches the registered authentication information. The determination module 102 determines whether or not there are a plurality of records in the user database DB in which the input authentication information and the registered authentication information match. The presence of a plurality of such records means that there are a plurality of users for which there is the possibility of successful authentication.

In this embodiment, two determinations are performed, that is, similarity of the face feature amounts and a passcode match are performed, and therefore each of the plurality of users for which there is the possibility of successful authentication is a user for which the input face feature amount and the registered face feature amount are similar and the input passcode and the registered passcode match. The determination module 102 determines whether or not there are a plurality of records in the user database DB in which the input face feature amount and the registered face feature amount are similar and the input passcode and the registered passcode match. The methods of determining similarity and matching are as described above.

In this embodiment, the determination module 102 determines whether or not there is similarity based on a second standard lower than the first standard. A lower standard is a standard based on which it is easier to determine that there is similarity and harder to determine that there is not similarity. The expression "lower standard" has the same meaning as "easier standard" or "looser standard". When the success or failure of authentication is determined based on the similarity degree as in this embodiment, the value of the threshold value is low. The second standard has a smaller threshold value than that of the first standard. In place of preparing those two standards, only one standard may be prepared. That is, the standard of the authentication module 101 and the standard of the determination module 102 may be the same.

Figure 9:
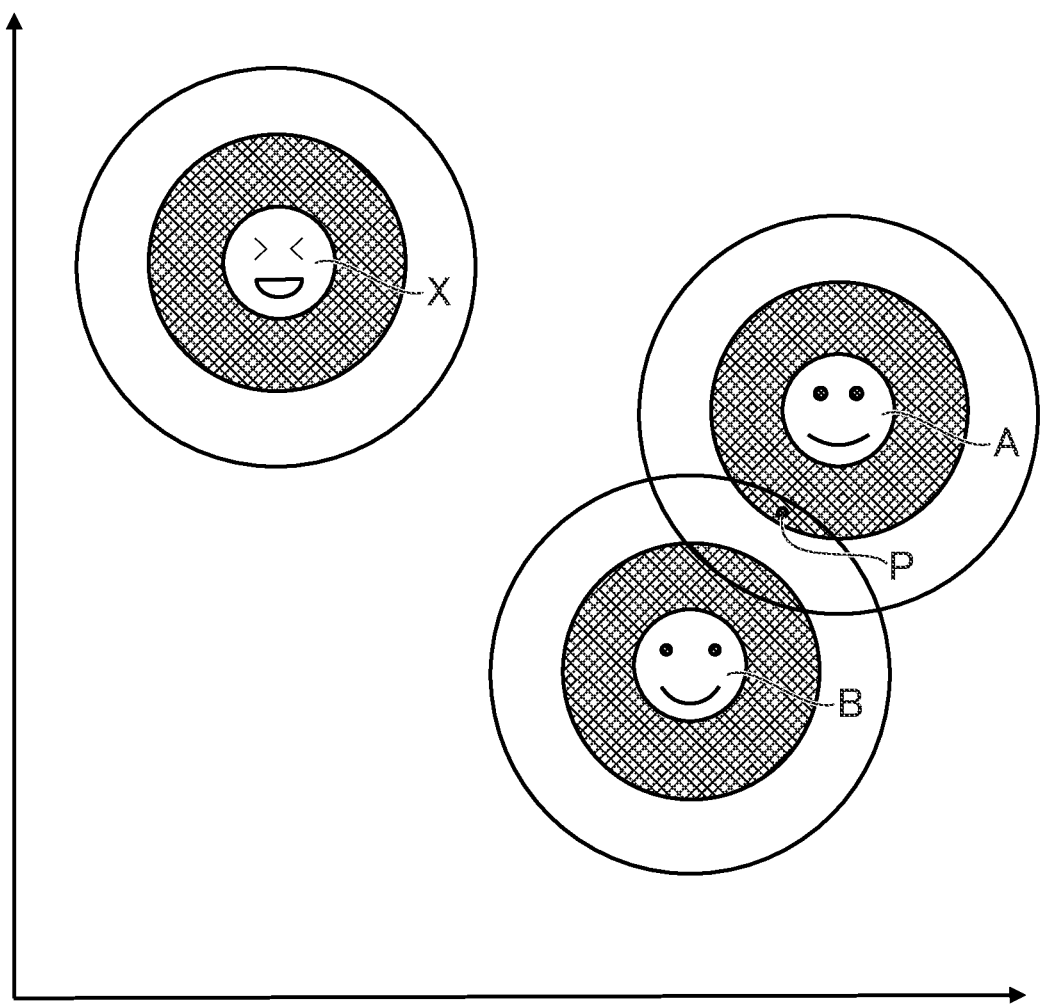
FIG. 9 is a graph for showing a relationship between a first standard and a second standard.

FIG. 9 is a graph for showing a relationship between the first standard and the second standard. There is described a case here in which the feature amount of the face of the user is represented by an m-dimensional vector (m is a natural number). In practice, the feature amount of the face is often represented by a vector of several tens to several hundreds of dimensions. However, in FIG. 9, in order to simplify the description, there is described a case in which the value of m is 2 and the feature amount of the face is represented by two-dimensional coordinates.

The example of FIG. 9 shows a case in which users A, B, and X perform a registration application, and all of the users have specified the passcode "1427". On two-dimensional coordinates as shown in FIG. 9, the difference in the feature amount of the face is represented as distance. When the distance is closer, the feature amount of the face is more similar, and when the distance is more distant, the feature amount of the face is less similar. The user X is distant in the vector space because the face of the user X is not similar to those of the users A and B, but the users A and B have a similar face to each other, and are close in the vector space.

In FIG. 9, the first standard is indicated by a dark halftone dot circle, and the second standard is indicated by a white circle. For this reason, the fact that the input face feature amount is in the dark halftone dot circle means that the first standard is satisfied, and the fact that the input face feature amount is in the white circle means that the second standard is satisfied. For example, when the input face feature amount is the symbol "P" of FIG. 9, "P" satisfies the first standard and the second standard of the user A, and satisfies the second standard of the user B.

In the example of FIG. 9, the user A and the user B have a similar face and the same passcode as each other, and therefore there is the possibility that one user may impersonate the other user. For example, when the dark halftone dot circle of the user A and the dark halftone dot circle of the user B overlap, the possibility of impersonation increases. In this case, the determination module 102 determines that there are a plurality of users for which there is the possibility of successful authentication.

Further, for example, even in a case in which the dark halftone dot circle of the user A and the dark halftone dot circle of the user B do not overlap, when the white circle of one of those users overlaps the halftone dot circle of the other of those users, and when for some reason the feature amount of the face of the one user is detected as the other of those users, there is the possibility of impersonation. In this case, the determination module 102 determines that there are a plurality of users for which there is the possibility of successful authentication.

[Generation Module]

The generation module 103 is mainly implemented by the control unit 11. The generation module 103 is configured to specify the difference in the user information on each of the plurality of users for which there is the possibility of successful authentication, and to generate additional authentication information.

The difference in the user information is the difference or discrepancy between the user information on a certain user and the user information on another user. All of the user information may be different, or only a part of the user information may be different. For example, when the user information is a telephone number, all of the digits of the telephone number may be different, or only a part of the digits of the telephone number may be different. As another example, when the user information is an email address, all of the characters of the email address may be different, or only a part of the characters of the email address may be different.

The additional authentication information is authentication information to be used in additional authentication. The meaning of the authentication information is as described above. All of the user information may be used as the additional authentication information, or only a part of the user information may be used as the additional authentication information. When the additional authentication information is only a part of the user information, a continuous portion of the user information (for example, the last three digits of the telephone number) may be the additional authentication information, or a non-continuous portion of the user information (for example, the fifth and eighth digits of the telephone number) may be the additional authentication information.

In this embodiment, the generation module 103 generates the additional authentication information such that the input amount of the additional authentication information falls in a fixed range. The input amount is the information amount of the additional authentication information, and can be referred to as "operation amount". For example, the input amount is the number of digits, the number of characters, or the number of times of key inputs. The fixed range may be any range determined in advance. For example, the fixed range may be a range in which only an upper limit is set, a range in which only a lower limit is set, or a range in which both an upper limit and a lower limit are set. In this embodiment, the generation module 103 generates the additional authentication information such that the input amount falls within two to four digits.

In this embodiment, the user information includes a plurality of items, and a priority order is defined for each of the plurality of items. The generation module 103 generates the additional authentication information based on the priority order of each of the plurality of items.

The "items" are the type of the user information. The fields of the user database DB correspond to the items. In this embodiment, there is described a case in which there are two items, namely, a telephone number and an email address. However, the number of items may be one or three or more. For example, when each of the telephone number, email address, date of birth, and name is used as the additional authentication information, the number of items is four.

The priority order is the priority in which the additional authentication information is to be used. The priority order may be specified by the administrator of the authentication system S. For example, an item that is easy for the user to remember and easy to input has a higher priority order. In this embodiment, the priority order of the telephone number, which requires only numeric input, is higher, and the priority order of the email address, which may require symbols to be input, is lower. It is assumed that the priority order is stored in the data storage unit 100 in advance.

The generation module 103 determines, in order of the priority order of each of the plurality of items, whether or not there is a difference in the user information. When the generation module 103 determines that there is a difference in the user information, the generation module 103 sets all or a part of the difference as the additional authentication information. When the generation module 103 determines that there is not a difference in the user information, the generation module 103 determines whether or not there is a difference in the user information for the item having the next priority order.

As described above, in this embodiment, the additional authentication information is generated such that the input amount falls within the fixed range, and therefore the generation module 103 determines, in order of the priority order, whether or not there is a difference in the user information such that the input amount falls within the fixed range. For this reason, even in a case in which there is a difference in the user information, when the difference is too small, additional authentication information is not generated, and the generation module 103 determines whether or not there is a difference in the user information for the item having the next priority order. When the difference in the user information is large, all of the user information may be the additional authentication information. When the input amount does not fall within the fixed range, a part of the user information may be the additional authentication information.

In this embodiment, the user information includes a plurality of information portions, a priority order is defined for each of the plurality of information portions, and the generation module 103 generates the additional authentication information based on the priority order of each of the plurality of information portions.

The information portions are a plurality of portions included in one piece of user information. Each information portion may or may not overlap with another information portion. For example, when the user information is a telephone number, portions consisting of the last two digits, the last three digits, the last four digits, the fourth to seventh digits, and the third and eighth digits of the telephone number correspond to the information portions. As another example, when the user information is an email address, the portions before and after the "@" symbol, the second to fifth characters, and the fourth and sixth characters of the email address correspond to the information portions.

The generation module 103 determines, in order of the priority order of each of the plurality of information portions, whether or not there is a difference in the user information. When the generation module 103 determines that there is a difference in the user information, the generation module 103 sets all or a part of the difference as the additional authentication information. When the generation module 103 determines that there is not a difference in the user information, the generation module 103 determines whether or not there is a difference in the user information for the information portions having the next priority order. As described above, in this embodiment, the additional authentication information is generated such that the input amount falls within the fixed range, and therefore it is assumed that information portions falling within the fixed range are set.

Figure 10:
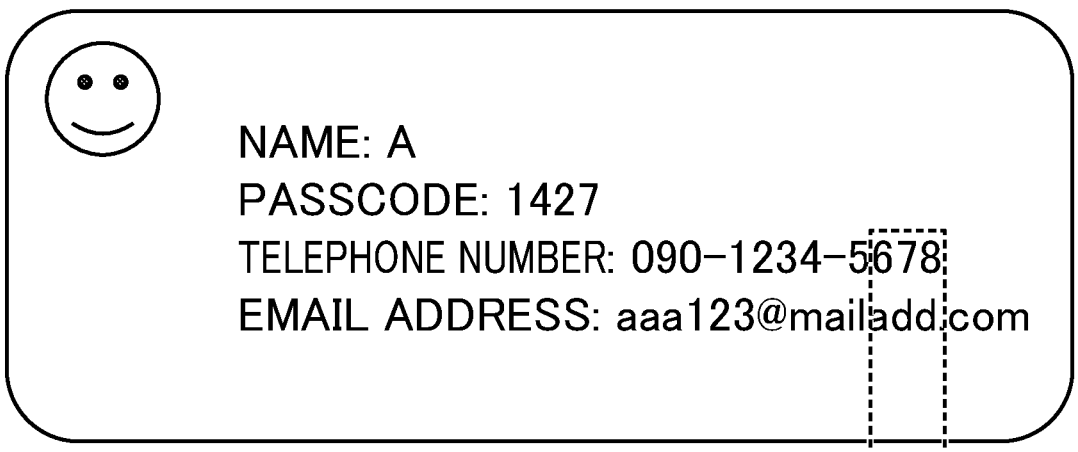
FIG. 10 is a diagram for illustrating processing of a generation module.
Figure 10:
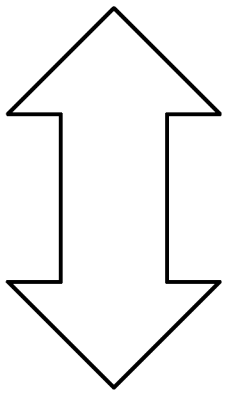
Figure 10:
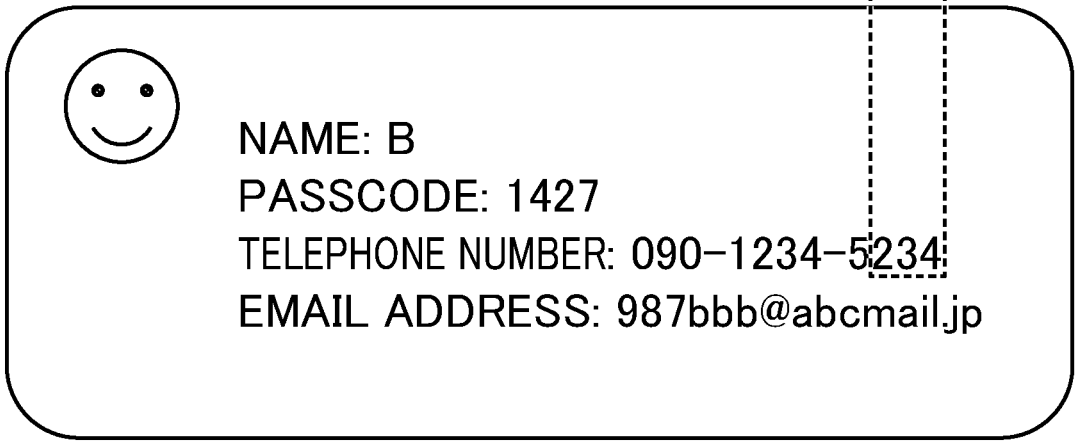

FIG. 10 is a diagram for illustrating processing of the generation module 103. As illustrated in FIG. 10, the generation module 103 determines, in order of the priority order, whether or not there is a difference in the user information on each of the plurality of items and whether or not there is a difference in each of the plurality of information portions. For example, of the user information on the item having the first priority order (in the example of FIG. 10, the telephone number), the generation module 103 determines whether or not there is a difference in the information portion having the first priority order (in the example of FIG. 10, the last three digits).

When the generation module 103 determines that there is a difference in the first information portion of the item having the first priority order, the generation module 103 generates the difference as the additional authentication information. In the example of FIG. 10, the last three digits of the telephone numbers of the users A and B are different, and therefore the generation module 103 generates the last three digits of the telephone numbers as the additional authentication information.

When the generation module 103 determines that there is not a difference in the first information portion of the item having the first priority order, the generation module 103 determines whether or not there a difference in the information portion having the second priority order (for example, the fourth to seventh digits). Then, the generation module 103 repeats the determination processing in order of the priority order until a difference is found in the information portion of the item having the first priority order.

When the generation module 103 did not find a difference in the item having the first priority order, the generation module 103 determines whether or not there is a difference in the first information portion (for example, the three characters before the "@" symbol) of the item having the second priority order (in this embodiment, the email address). Then, the generation module 103 repeats the determination processing in order of the priority order until a difference in the information portion of the item having the second priority order is found. When the generation module 103 finds a difference in the information portion, the difference is generated as the additional authentication information.

[Input Request Module]

The input request module 104 is mainly implemented by the control unit 11. The input request module 104 is configured to request, when it is determined that there are a plurality of users for which there is the possibility of successful authentication, input of the additional authentication information that is based on the difference in the user information on each of the plurality of users.

Requesting input of the additional authentication information means urging input of the additional authentication information. The input request module 104 requests input of the additional authentication information by issuing a predetermined notification to the user. The notification may be any notification that can be perceived by the user. In this embodiment, a visual notification is issued by using an image, but the notification may be an auditory notification using sound or a tactile notification using vibrations or the like.

In this embodiment, the input request module 104 is implemented by the server 10. Therefore, the input request module 104 transmits, to the authentication device 30, data for requesting input of the additional authentication information. This data can be in any form, for example, a message, an image, a push notification, or an email. The data for requesting input of the additional authentication information is stored in the data storage unit 100 in advance. The input request module 104 requests input of the additional authentication information based on the data stored in the data storage unit 100.

In this embodiment, the generation module 103 generates the additional authentication information. Therefore, the input request module 104 notifies the user of the item and the information portion of the additional authentication information generated by the generation module 103, and requests input of the information portion of the relevant item. That is, the input request module 104 notifies the user of the item and the portion of the item to be input as the additional authentication information in order to allow the user to grasp which user information and which portion are to be input as the additional authentication information.

[Additional Authentication Module]

The additional authentication module 105 is mainly implemented by the control unit 11. The additional authentication module 105 is configured to perform additional authentication based on the input additional authentication information. In this embodiment, the generation module 103 generates the additional authentication information. Therefore, the additional authentication module 105 performs additional authentication based on the input additional authentication information and the generated additional authentication information. It is assumed that the additional authentication information generated by the generation module 103 is stored in the data storage unit 100. The additional authentication itself may be performed in the same manner as the above-mentioned authentication. The additional authentication module 105 may perform additional authentication based on a match or similarity of the additional authentication information. In the description of the authentication module 101, the expression "registered authentication information" may be read as "generated additional authentication information".

[Change Request Module]

The change request module 106 is mainly implemented by the control unit 11. The change request module 106 is configured to request, from among the plurality of users for which there is the possibility of successful authentication, a user determined based on the registration date and time of the passcode to change his or her passcode.

The registration date and time is the date and time at which the passcode is registered in the user database DB, or a date and time around that date and time. For example, the registration date and time is the date and time at which a use registration by the user is received, the date and time at which a new record is created in the user database DB, or the date and time at which the passcode is stored in the record.

The user determined based on the registration date and time is a user selected based on the registration date and time and a predetermined selection condition. Any condition can be set as the selection condition. For example, the selection condition may be: having the oldest registration date and time, having a registration date and time that is before a predetermined date and time, selecting a predetermined number of people in order of oldest registration date and time, having the latest registration date and time, having a registration date and time after a predetermined date and time, or selecting a predetermined number of people in order of latest registration date and time.

For example, in the example of FIG. 9, the users A and B are both users for which there is the possibility of successful authentication. As shown in the data storage example of FIG. 8, the registration date and time of the user B is older than the registration date and time of the user A, and therefore the change request module 106 requests the user B to change his or her passcode.

The change of the passcode may be requested by using a predetermined method, and is performed by using, for example, an email, an SMS, a message application, a push notification, or an SNS. The change request module 106 transmits to the user terminal 20 data urging the passcode to be changed. The data includes the URL of the server 10. The user selects the URL to display a screen for changing the passcode on the user terminal 20. The server 10 stores the new passcode input from the screen in the user database DB, and changes the passcode. Changing the passcode can also be referred to as "updating the passcode".

[Processing Execution Module]

The processing execution module 107 is mainly implemented by the control unit 11. The processing execution module 107 is configured to execute predetermined processing based on the authentication result. In this embodiment, three types of authentication are performed, namely, the first authentication, the second authentication, and additional authentication. Therefore, the processing execution module 107 does not execute the predetermined processing when at least one of the three types of authentication fails, and executes the predetermined processing only when all three types of authentication are successful. When additional authentication is not performed, the processing execution module 107 executes the predetermined processing when the first authentication and the second authentication are successful.

The predetermined processing is processing permitted to be executed when authentication is successful. In this embodiment, there is described a case in which processing for unlocking the security gate SG corresponds to the predetermined processing, but any processing is applicable as the predetermined processing. Examples of the predetermined processing include login processing to a server or a terminal, processing of unlocking a computer, processing of permitting data browsing, processing of permitting data writing, processing of opening and closing an automatic door, processing of permitting electronic voting, and processing of permitting acquisition of a public document.

The processing execution module 107 itself may control the unlocking, but in this embodiment, a processing execution module 303 of the authentication device 30 executes the unlocking control, and therefore the processing execution module 107 notifies an authentication result to the authentication device 30. For example, when at least one of the three types of authentication fails, the processing execution module 107 does not transmit a notification indicating that authentication has been successful, and when all the three types of authentication are successful, transmits a notification indicating that authentication has been successful. When the authentication by the user has not been successful a certain number of times, the authentication information on the record storing the passcode input by the user or the record storing the feature amount similar to the face of the user may be locked and prevented from being used.

[1-3-2. Functions to be Implemented by User Terminal]

As illustrated in FIG. 7, in the user terminal 20, a data storage unit 200, a reception module 201, and a transmission module 202 are implemented. In this embodiment, there is described a case in which the user terminal 20 is included in the authentication system S, but the user terminal 20 may be an external device that can communicate to and from the authentication system S.

[Data Storage Unit]

The data storage unit 200 is mainly implemented by the storage unit 22. The data storage unit 200 is configured to store the data required for the registration application. For example, the data storage unit 200 stores data of the face photograph of the user. The data storage unit 200 may also store a user ID and a password.

[Reception Module]

The reception module 201 is mainly implemented by the control unit 21. The reception module 201 is configured to receive input operations for the user to perform a registration application. For example, the reception module 201 receives input of the user ID, the password, the file name of the face photograph, the passcode, the telephone number, and the email address to each of the input forms F10 to F15. The input operations received by the reception module unit 201 are not limited to those input operations, and various other input operations can be received.

[Transmission Module]

The transmission module 202 is mainly implemented by the control unit 21. The transmission module 202 is configured to transmit data for performing the registration application, based on an input operation received by the reception module 201. For example, the transmission module 202 transmits the user ID, the password, the face photograph data, the passcode, the telephone number, and the email address to the server 10 based on the input operations to each of the input forms F10 to F15. The data transmitted by the transmission module 202 is not limited to those pieces of data, and various other data can be transmitted.

[1-3-3. Functions to be Implemented by Authentication Device]

As illustrated in FIG. 7, in the authentication device 30, a data storage unit 300, a reception module 301, a transmission module 302, and the processing execution module 303 are implemented. In this embodiment, there is described a case in which the authentication device 30 is included in the authentication system S, but the authentication device 30 may be an external device that can communicate to and from the authentication system S.

[Data Storage Unit]

The data storage unit 300 is mainly implemented by the storage unit 32. The data storage unit 300 is configured to store the data required for authentication. For example, the data storage unit 300 stores information on the IP address of the server 10 and the like. As another example, the data storage unit 300 stores data (e.g., HTML data or image data) for displaying the input forms F35a and F35b and the like on the display unit 35.

[Reception Module]

The reception module 301 is mainly implemented by the control unit 31. The reception module 301 is configured to receive input operations. The input operations may be input operations required for authentication. In this embodiment, an input operation of the user is not required for face authentication, and hence the reception module 301 receives a passcode input operation. For example, the reception module 301 receives input of the passcode to the input form F35a. Further, for example, when additional authentication has occurred, the reception module 301 receives input of the additional authentication information to the input form F35b.

It is sufficient for the reception module 301 to receive an input operation corresponding to the type of authentication to be used by the authentication system S. For example, when fingerprint authentication is to be used, an input operation of the user placing a finger on a camera, a sensor, or the like is received. As another example, when handwriting authentication is to be used, an input operation of the user writing characters on a touch panel or the like is received. As another example, when password authentication or countersign authentication is to be used, the reception module 301 receives an operation of inputting a password or a countersign. A microphone may be arranged in the authentication device 30, and the countersign may be detected by the microphone.

[Transmission Module]

The transmission module 302 is mainly implemented by the control unit 31. The transmission module 302 is configured to transmit information required for authentication, based on the input operation. The transmission module 302 may transmit the authentication information itself or may transmit information for identifying the authentication information.

In this embodiment, there is described a case in which the first authentication module 101a and the second authentication module 101b are implemented by the server 10, and therefore there is described a case in which the transmission module 202 transmits the data to the server 10. When the first authentication module 101a and the second authentication module 101b are to be implemented by another computer, the data may be transmitted to the another computer. For example, when the first authentication module 101a and the second authentication module 101b are to be implemented by different computers, the transmission module 202 is only required to transmit the information to those computers.

In this embodiment, the first authentication is face authentication and the second authentication is passcode authentication, and therefore the transmission module 302 transmits an image (face photograph) photographed by the photographing unit 36 and the passcode input to the input form F35a. The feature amount of the face may be calculated on the authentication device 30 side, and in this case, the transmission module 302 transmits the calculated feature amount of the face in place of the image. Further, for example, the transmission unit 302 transmits the additional authentication information input to the input form F35b.

It is sufficient for the transmission module 302 to transmit information corresponding to the type of authentication to be used by the authentication system S. For example, when fingerprint authentication is to be used, the transmission module 302 may transmit an image of the finger of the user, or a feature amount of the finger calculated from the image may be transmitted. As another example, when handwriting authentication is to be used, the transmission module 302 may transmit an image of characters written on a touch panel or the like by the user, or may transmit coordinate information indicating a change in touch position. As another example, when password authentication or countersign authentication is to be used, the transmission module 302 transmits a password or countersign input by the user.

[Processing Execution Module]

The processing execution module 303 is mainly implemented by the control unit 31. The processing execution module 303 is configured to execute predetermined processing when authentication and additional authentication are successful. The processing execution module 303 executes the predetermined processing when the three types of authentication, namely, the first authentication, the second authentication, and the additional authentication, are successful. The meaning of the predetermined processing is as described above, and is processing permitted to be executed when authentication is successful. When additional authentication is not performed, the processing execution module 303 executes the predetermined processing when the two types of authentication, namely, the first authentication and the second authentication, are successful.

In this embodiment, when all the three types of authentication are successful, the security gate SG is unlocked. Therefore, when a notification indicating that authentication is successful is received, the processing execution module 303 unlocks the lock by causing a motor or the like of the lock mechanism to rotate, and when a notification indicating that the authentication is successful is not received, the processing execution module 303 does not unlock the lock. When all the three types of authentication are successful, the processing execution module 107 of the server 10 may transmit a signal for unlocking the lock mechanism in place of a notification indicating that authentication is successful. In this case, the processing execution module 303 of the authentication device 30 is only required to unlock the lock based on the signal.

[1-4. Processing to be Executed in this Embodiment]

Figure 11:
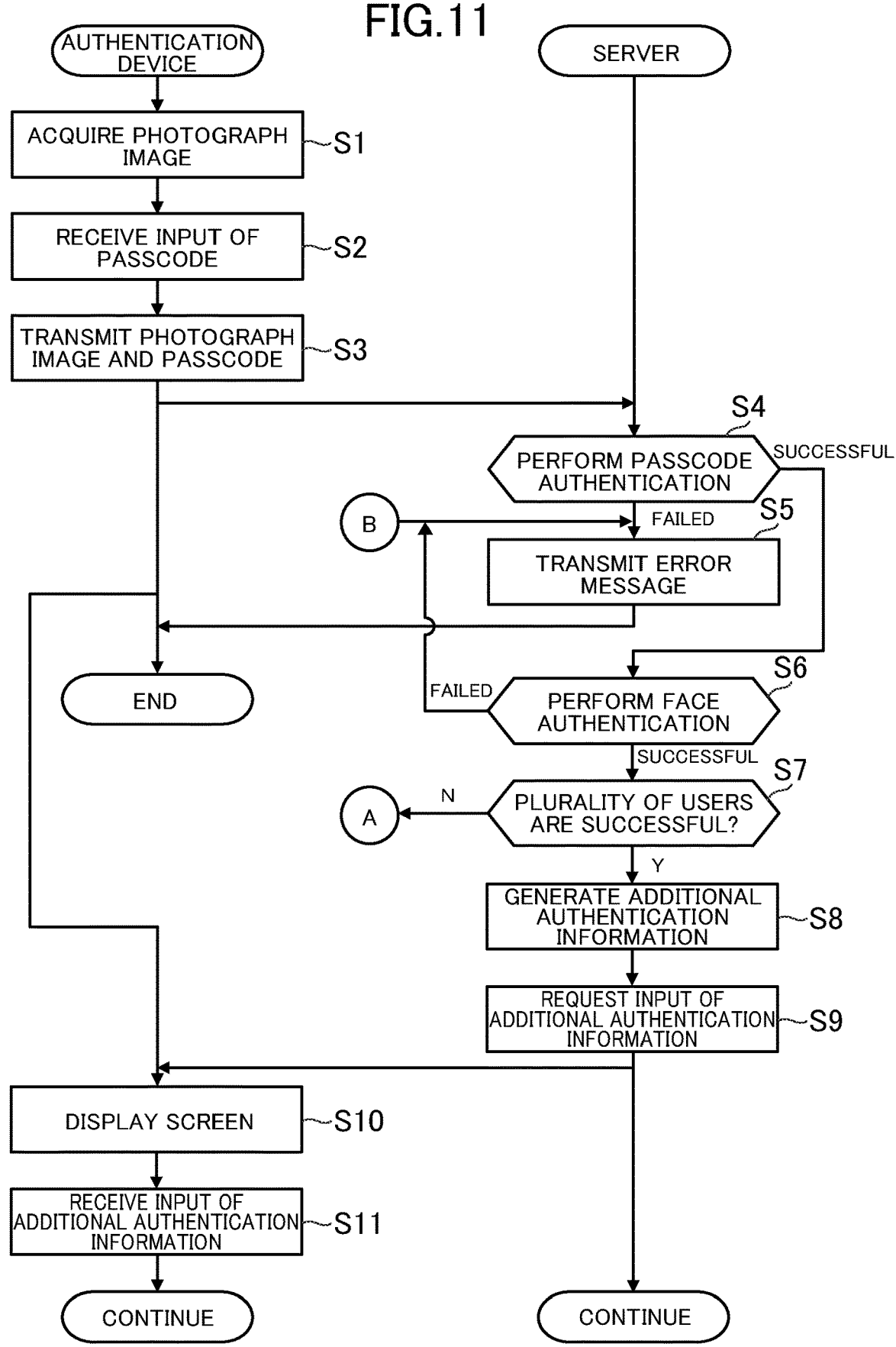
FIG. 11 is a flowchart for illustrating an example of processing to be executed in this embodiment.
Figure 12:
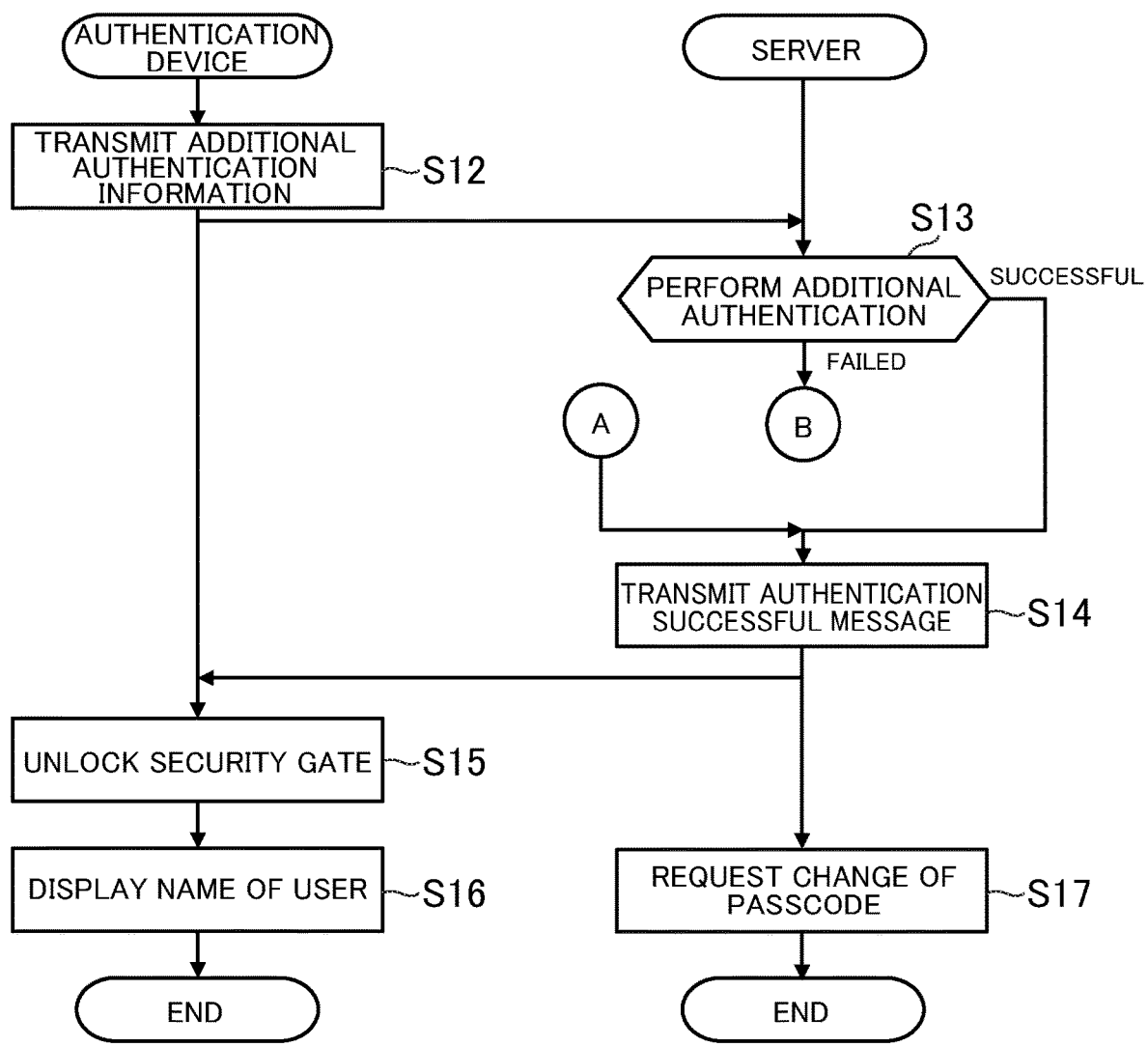
FIG. 12 is a flowchart for illustrating the example of processing to be executed in this embodiment.

FIG. 11 and FIG. 12 are flowcharts for illustrating an example of authentication processing to be executed in this embodiment. The authentication processing illustrated in FIG. 11 and FIG. 12 is executed by the control units 11 and 31 operating in accordance with programs stored in the storage units 12 and 32, respectively. The processing described below is an example of processing to be executed by the functional blocks illustrated in FIG. 7. When authentication processing is to be executed, it is assumed that use registration is complete.

As illustrated in FIG. 11, first, in the authentication device 30, the control unit 31 acquires a photographed image based on a detection signal of the photographing unit 36 (Step S1). In Step S1, the control unit 31 acquires a photographed image generated by the photographing unit 36, and displays the acquired photographed image in the display area A35 of the display unit 35. The input form F35a and the button B35a are also displayed on the display unit 35, and the display unit 35 can receive input of the passcode by the user.

The control unit 31 receives input of the passcode by the user based on a detection signal of the operation unit 34 (Step S2). In Step S2, the control unit 31 receives input of the four-digit passcode to the input form F35a. For example, a software numeric keypad for inputting the passcode is displayed on the display unit 35.

The control unit 31 transmits, in response to the user selecting the button B35a, the photographed image acquired in Step S1 and the passcode input in Step S2 to the server 10 (Step S3).

In the server 10, when the photographed image and the passcode are received, the control unit 11 performs passcode authentication based on the user database DB (Step S4). In Step S4, the control unit 11 determines whether or not there is a user having a matching passcode. When there is a user having a matching passcode, authentication is successful, and when there is no user having a matching passcode, authentication fails.

In this embodiment, all users who have a matching passcode are identified. Therefore, in Step S4, the control unit 11 execute the search by using the four-digit passcode input by the user as a query and the four-digit passcodes stored in the user database DB as an index. In this search, a complete match between the passcodes is determined. When a complete match is retrieved, authentication is successful, and when a complete match is not retrieved, authentication fails.

When passcode authentication fails (Step S4: Failure), the control unit 11 transmits a predetermined error message to the authentication device 30 (Step S5), and the processing ends. In this case, the error message is displayed on the display unit 35 of the authentication device 30 to notify the user that the passcode is different.

Meanwhile, when passcode authentication is successful (Step S4: Successful), the control unit 11 performs face authentication based on the feature amount of the face of the photographed image received in Step S4 and the feature amount of the face of the user matching the passcode (Step S6). In Step S6, the control unit 11 calculates the similarity degree based on the difference between those feature amounts, and determines whether or not there is a user having a similarity degree equal to or more than a threshold value. When there is a user having a similarity degree equal to or more than the threshold value, authentication is successful, and when there is no user having a similarity degree equal to or more than the threshold value, authentication fails.

When face authentication fails (Step S6: failure), the processing advances to Step S5, an error message is transmitted, and the processing ends. In this case, the error message is displayed on the display unit 35 of the authentication device 30 to notify the user that face authentication has not been successful.

Meanwhile, when face authentication is successful (Step S6: Successful), the control unit 11 determines whether or not there are a plurality of users for which there is the possibility of successful face authentication and passcode authentication (Step S7). In Step S7, the control unit 11 determines whether or not there are a plurality of users having a similar face feature amount to each other and having a matching passcode. The processing of Step S7 may be determined based on the same standard as that in Step S6, or may be determined based on a lower standard than that in Step S6. That is, in Step S6, the determination may be made based on the above-mentioned first standard, and in Step S7, the determination may be made based on the above-mentioned second standard.

When it is not determined that there are a plurality of users for which there is the possibility of successful face authentication and passcode authentication (Step S7: N), the processing advances to Step S14 described later, and the security gate SG is unlocked. Meanwhile, when it is determined that there are a plurality of users for which there is the possibility of successful face authentication and passcode authentication (Step S7: Y), the control unit 11 generates, based on the user database DB, the additional authentication information based on a difference in the user information on each of the plurality of users (Step S8). In Step S8, the control unit 11 generates the additional authentication information based on the priority order of each of the plurality of items and priority order of each of the plurality of information portions.

For example, the control unit 11 compares the last three digits of the telephone number of each of the plurality of users for which there is the possibility of successful face authentication and passcode authentication, and determines whether or not there is a difference. When the last three digits of the telephone numbers are different, the control unit 11 generates the last three digits of the telephone number as the additional authentication information. When the last three digits of the telephone numbers are the same, the control unit 11 compares the fourth to seventh digits of the telephone numbers, and determines whether or not there is a difference. When the fourth to seventh digits of the telephone numbers are different, the control unit 11 generates the fourth to seventh digits of the telephone number as the additional authentication information. When the fourth to seventh digits of the telephone numbers are the same, the control unit 11 compares the email addresses, and determines whether or not there is a difference. When the email addresses are different, the control unit 11 generates all or a part of the different portion of the email addresses as the additional authentication information. When the email addresses are the same, the processing may advance to Step S5, and an error message may be displayed.

The control unit 11 requests the authentication device 30 to input the additional authentication information (Step S9). It is assumed that the request for input of the additional authentication information includes information for identifying the items of the user information generated as the additional authentication information.

When the authentication device 30 receives the request, the control unit 31 displays on the display unit 35 a screen for receiving input of the additional authentication information (Step S10). In Step S10, the control unit 31 displays on the display unit 35 a message indicating that additional authentication has occurred, the items and the information portion to be input as the additional authentication information, the input form F35b, and the button B35b.

The control unit 31 receives, based on the detection signal of the operation unit 34, input of the additional authentication information by the user (Step S11). In Step S11, the control unit 31 receives input of the additional authentication information to the input form F35b. For example, a software keyboard for inputting the passcode is displayed on the display unit 35. The control unit 31 transmits the additional authentication information input in Step S11 to the server 10 (Step S12).

Moving to FIG. 12, when the server 10 receives the additional authentication information, the control unit 11 performs additional authentication (Step S13). In Step S13, the control unit 11 determines whether or not the input additional authentication information matches the additional authentication information generated in Step S8. When there are users for which those pieces of additional authentication match, authentication is successful. When there are no users for which those pieces of additional authentication do not match, authentication fails.

When additional authentication is successful (Step S13: Successful), the control unit 11 transmits, to the authentication device 30, an authentication successful notification indicating that all authentications are successful (Step S14). The authentication successful notification is performed by transmitting data having a predetermined format, and includes the name of the user for which authentication is successful. That is, the name of the user having a telephone number or email address matching the telephone number or email address input in the additional authentication is included in the authentication success notification.

In the authentication device 30, when the notification is received, the control unit 31 unlocks the security gate SG (Step S15), displays the name of the user for which authentication has been successful on the display unit 35 (Step S16), and the processing ends. The user confirms that his or her name is displayed on the display unit 35, and pushes the door of the security gate to pass through the security gate. In this case, information such as the name of the user and the current date and time may remain in the server 10 as a traffic record.

In the server 10, the control unit 11 requests, based on the user database DB, the user having the oldest passcode registration date and time to change his or her passcode (Step S17), and the processing ends. In Step S17, the control unit 11 compares the registration date and time of each passcode of the plurality of users determined in Step S7, and transmits, to the email address of the user having the oldest registration date and time, an email including a URL for changing the passcode. When the determination in Step S7 is "N" and the processing of Step S14 is executed, the processing of Step S17 is not executed.

According to the authentication system S, when it is determined, based on the input authentication information, that there are a plurality of users for which there is the possibility of successful authentication, security can be sufficiently enhanced by requesting input of additional authentication information and performing additional authentication. For example, even when there are a plurality of users having a similar face to each other and having the same passcode, through performing additional authentication based on a difference in the user information, authentication is performed by using additional authentication information that in principle only the person himself or herself can know, and impersonation by a malicious third party can be prevented. Moreover, through using the user information as the additional authentication information, it is possible to perform additional authentication by using information that is easy for the user to remember and easy to input. Moreover, for example, through using additional authentication information that is based on a difference in the user information, it is possible to perform additional authentication by using information that can identify each of the plurality of users having a similar face to each other and the same passcode. It is thus possible to effectively enhance security.

The authentication system S can generate additional authentication information capable of identifying a plurality of users for which there is the possibility of successful authentication by identifying a difference in the user information on each of those users based on the input authentication information. It is thus possible to effectively enhance security.

The authentication system S can appropriately ensure a balance between usability and security by generating additional authentication information such that an input amount falls within a fixed range. For example, it is possible to prevent the additional authentication information from being too complicated and to perform additional authentication by using information that is easy for the user to remember and easy to input. Moreover, for example, it is possible to prevent additional authentication information from being too simple, to thereby ensure security.

The authentication system S can effectively ensure a balance between usability and security by generating additional authentication information based on a priority order of each of a plurality of items of user information. For example, usability can be enhanced by increasing the priority order of items that are easy for the user to remember and easy to input. Moreover, for example, security can be improved by increasing the priority order of items that are difficult for other users to guess.

The authentication system S can effectively ensure a balance between usability and security by generating additional authentication information based on a priority order of each of a plurality of information portions of user information. For example, usability can be enhanced by increasing the priority order of information portions that are easy for the user to remember and easy to input. Moreover, for example, security can be improved by increasing the priority order of information portions that are difficult for other users to guess.

The authentication system S performs authentication based on similarity between the input authentication information and the registered authentication information, but such authentication is susceptible to impersonation by a malicious third party. However, even when such authentication is used, security can be sufficiently enhanced by requesting input of additional authentication information and performing additional authentication.

The authentication system S can also effectively improve security by performing two-step authentication combining the first authentication based on the similarity of the authentication information and the second authentication based on the matching of the authentication information. Moreover, as described above, even when two-step authentication is performed, there may be cases in which impersonation by a malicious third party is not prevented, but impersonation can be prevented and security can be improved by performing additional authentication.

The authentication system S can also effectively improve security by requesting, from among a plurality of users having a similar face to each other and the same passcode, a user determined based on the registration date and time of the passcode to change the passcode.

Through the use of biometric authentication as the first authentication and passcode authentication as the second authentication, even when the user is not carrying anything such as a card key or the like, secure authentication can be ensured. Further, through adopting two-step authentication using biometric authentication, in which the user is not required to remember the authentication information, and passcode authentication, in which the authentication information is hard for the user to forget, usability can be improved while also improving security. In addition, for example, through the use of face authentication, to which the user has less resistance than to fingerprint authentication, DNA authentication, or other such authentication as biometric authentication, usability can be further improved.

The authentication system S also effectively improves security by determining whether or not there is similarity in face authentication based on the first standard, and determining users for which there is the possibility of successful authentication and performing additional authentication based on the second standard lower than the first standard.

2. Second Embodiment

Next, a second embodiment of the present invention (hereinafter referred to as "second embodiment") is described. In the first embodiment, there is described a case in which additional authentication is performed when there are a plurality of users having a similar face to each other and having the same passcode. However, any one of the users may be urged to change his or her passcode without particularly performing additional authentication. In the second embodiment, there is described a case in which a passcode change is urged without performing additional authentication. In the second embodiment, a description of parts that are the same as in the first embodiment is omitted.

In the server 10 in the second embodiment, the data storage unit, the first authentication module 101a, the second authentication module 101b, the determination module 102, the change request module 106, and the processing execution module 107 are implemented. In the second embodiment, the input request module 104, the additional authentication module 105, and the generation module 103 are not required to be implemented. The processing of the first authentication module 101a and the second authentication module 101b is as described in the first embodiment.

The determination module 102 in the second embodiment determines whether or not there are a plurality of users having a registered face feature amount similar to each other and having a registered passcode matching each other. The processing of the determination module 102 may be performed in a similar manner to the processing described in the first embodiment.

In the second embodiment, the determination processing is not required to be executed during user authentication, and may be executed at another timing. For example, the determination module 102 may determine whether or not there are a plurality of such users by comparing pieces of registered authentication information with each other, in place of comparing the input authentication information and the registered authentication information. That is, the determination module 102 may compare the feature amount of each of the faces stored in the user database DB to determine whether there are a plurality of users having a similar face to each other.

The change request module 106 in the second embodiment requests, from among the plurality of users determined by the determination module 102, a user determined based on the registration date and time of the passcode to change his or her passcode. The processing of the change request module 106 is as described in the first embodiment.

According to the second embodiment described above, impersonation can be prevented and security can be enhanced by requesting, from among a plurality of users having registered first authentication information similar to each other and having registered second authentication information matching each other, a user determined based on the registration date and time of the second authentication information to change his or her second authentication information.

3. Modification Examples

The present invention is not limited to the embodiments described above, and can be modified suitably without departing from the spirit of the present invention.

(1) For example, in the first embodiment, there is described a case in which additional authentication is performed on the condition that there are a plurality of users having a similar face and having the same passcode. However, additional authentication may be performed based on another condition. That is, even when there is only one user having a similar face and a matching passcode, additional authentication may be performed based on a certain condition.

Even when it is determined that there are not a plurality of users, the input request module 104 requests, based on a predetermined condition, input of a part or all of the user information on the user for which authentication is successful. The predetermined condition may be a condition determined in advance, for example, that an authentication count exceeds a threshold value, that a certain period of time elapses, that a predetermined date and time has arrived, or that a random number has become a predetermined value. The input request module 104 requests input of a part or all of the user information that is the additional authentication information when the predetermined condition is satisfied.

In this modification example, the part or all of the user information to serve as the additional authentication information is not required to be based on a difference in the user information between the users, and any user information may be the additional authentication information. For example, all of the user information on an item determined in advance may be the additional authentication information, or the user information of an information portion determined in advance of an item determined in advance may be the additional authentication information.

The additional authentication module 105 performs additional authentication based on the input part or all of the user information. The additional authentication method itself is as described in the embodiments. The additional authentication module 105 may perform additional authentication based on a match or similarity between the input part or all of the user information and the registered part or all of the user information.

According to Modification Example (1) of the present invention, additional authentication is performed based on a predetermined condition even when it is determined that there are not a plurality of users for which there is the possibility of successful authentication, and therefore security can be effectively enhanced. For example, when additional authentication is required only when there are users having a similar face and the same passcode, a user may realize that the user can impersonate another user. In this regard, for example, through requesting additional authentication at another timing, such as always performing additional authentication once every ten times, it is possible to prevent the user from realizing that the user can impersonate another user. As a result, impersonation can be effectively prevented.

(2) Further, for example, in the embodiment, a situation in which the user passes through the security gate SG is described as an example, but the authentication system S is also applicable to a situation in which the user purchases a product or uses a service. In this case, for example, the authentication device 30 is a vending machine, a ticket machine, a POS terminal, or a payment terminal in a store. The user faces the photographing unit 36 of the authentication device 30 and inputs the passcode from the operation unit 34. When face authentication and passcode authentication are successful, payment processing is executed, and the product can be purchased or the service can be used.

The processing execution module 107 in this modification example may execute, when authentication and additional authentication are successful, payment processing based on the payment information on a user for which authentication and additional authentication are successful. The payment information to be referred to at the time of payment processing is payment information associated with the user for which face authentication, passcode authentication, and additional authentication are successful.

The payment information is information required in order to perform payment, such as credit card information, electronic value (e.g., electronic money or points) account information, virtual currency account information, bank account information, or debit card information. It is assumed that the payment information is registered during user registration, and is stored in the user database DB in association with the user ID, for example. The payment information may be stored in a database different from the user database DB.

It is sufficient for the processing execution module 107 to execute payment processing corresponding to the payment information. For example, the processing execution module 107 executes credit processing based on credit card information, processing of decreasing an electronic value balance, processing of decreasing a virtual currency balance, processing of debiting and transferring from a bank account, or processing of decreasing the balance of the account indicated by debit card information. The processing execution module 107 does not execute payment processing when any one of face authentication and passcode authentication fails, and executes payment processing when face authentication and passcode authentication are successful.

When payment processing has been executed, that fact is displayed on the display unit 35 of the authentication device 30 or a terminal of the shop, and the user receives the product or uses the service. For example, in a case in which the authentication device 30 is a digital signage device installed in a shop or the like, when an authentication successful notification is received from the server 10, a message indicating that the authentication has been successful is displayed on the display unit 35. When a shop staff member confirms the message, the staff member hands over the product or provides the service to the user. In place of the authentication device 30, the message may be transferred to another computer, such as a terminal operated by the shop staff member, to be displayed. As another example, in a case in which the authentication device 30 is a vending machine, when an authentication successful notification is received from the server 10, the authentication device 30 discharges the product specified by the user or prepares a product such as coffee or instant food.

With the modification example described above, security at the time of purchasing a product or using a service can be sufficiently enhanced by preventing another user having a similar face from improperly purchasing a product or using a service by impersonating the user and paying. Further, from the viewpoint of the user, usability can be improved because it is possible to perform payment in a secure manner even when the user goes to the shop without carrying any money or the like, and from the viewpoint of the shop, shop's convenience can be improved because payment is possible without requiring a dedicated device, for example, a credit card reader, to be installed.

(3) Further, for example, the above-mentioned modification examples may be combined.

For example, there has been described a case in which biometric authentication is executed based on an image photographed by the photographing unit 36 of the authentication device 30. However, the biometric authentication may also be executed by using another sensor, such as an infrared sensor or an ultrasonic sensor. The authentication system S is only required to include a sensor corresponding to the biometric authentication to be used as the first authentication.

For example, there has been described a case in which the authentication information is input to the authentication device 30, but the authentication information may be input to the user terminal 20 or another computer. Further, for example, there has been described a case in which biometric authentication is the first authentication, but the first authentication may be any authentication based on similarity, and is not limited to biometric authentication. For example, pattern authentication in which the user draws a predetermined locus on a touch panel may be used as the first authentication. As another example, the first authentication may be authentication based on similarity between countersigns. In this case, when the countersign input by the user is similar to the countersign registered in the user database DB (proportion of matching part is equal to or more than threshold value), authentication is successful, and when those countersigns are not similar, authentication fails. As another example, as the first authentication, a plurality of biometric authentications may be used in combination, or pattern authentication and countersign authentication may be used in combination.

For example, there has been described a case in which passcode authentication is the second authentication, but a plurality of authentications may be combined for the second authentication. For example, the second authentication may be a combination of countersign authentication and passcode authentication. In this case, the second authentication information is a combination of a countersign and a passcode. Further, for example, other authentication methods may be used for the second authentication, such as password authentication, private key authentication, or electronic certificate authentication.

For example, there has been described a case in which the main functions are implemented by the server 10, but each function may be shared by a plurality of computers. For example, functions may be shared among the server 10, the user terminal 20, and the authentication device 30. For example, the authentication processing may be executed by the user terminal 20 or the authentication device 30 in place of the server 10. Further, for example, when the authentication system S includes a plurality of server computers, the functions may be shared by those plurality of server computers. In addition, for example, the data described as being stored in the data storage unit 100 may be stored by a computer other than the server 10.

The invention claimed is:

1. An authentication system, comprising at least one processor configured to execute computer program code, the computer program code comprising:
   first authentication code configured to cause the at least one processor to perform authentication based on input authentication information, wherein the input authentication information is biometric face information;
   determination code configured to cause the at least one processor to determine, based on the input authentication information, whether there are a plurality of users for which there is a possibility of successful authentication;
   requesting code configured to cause the at least one processor to request, when it is determined that there are the plurality of users, input of additional authentication information that is based on a difference in user information on each of the plurality of users; and
   additional authentication code configured to cause the at least one processor to perform additional authentication based on the input additional authentication information,
   wherein the plurality of users comprises a first person and a second person, the difference is found before the performing the additional authentication, and the difference is a difference between first numerical data of the first person and second numerical data of the second person,
   the computer program code further comprising second determination code configured to cause the at least one processor to perform repeating a determination comparing first user data of the first person with second user data of the second person until the difference is found, the difference corresponding to specific first user data of the first user; and the request is configured to obtain from the first person the specific first user data to confirm an identity of the first user.

2. The authentication system according to claim 1, wherein the at least one processor is configured to identify a difference in the user information on each of the plurality of users, and generate the additional authentication information, and
   wherein the at least one processor is configured to perform the additional authentication based on the input additional authentication information and the generated additional authentication information.

3. The authentication system according to claim 2, wherein the at least one processor is configured to generate the additional authentication information such that an input amount of the additional authentication information falls within a fixed range.

4. The authentication system according to claim 2,
   wherein the user information includes a plurality of items, wherein a priority order is defined for each of the plurality of items, and wherein the at least one processor is configured to generate the additional authentication information based on the priority order of each of the plurality of items.

5. The authentication system according to claim 2,
wherein the user information includes a plurality of information portions,
wherein a priority order is defined for each of the plurality of information portions, and
wherein the at least one processor is configured to generate the additional authentication information based on the priority order of each of the plurality of information portions.

6. The authentication system according to claim 1,
wherein the at least one processor is configured to perform the authentication based on similarity between the input authentication information and the registered authentication information, and
wherein each of the plurality of users is a user for which the input authentication information is similar to the registered authentication information.

7. The authentication system according to claim 6,
wherein the at least one processor is configured to perform a first authentication based on similarity between input first authentication information and registered first authentication information,
wherein the at least one processor is configured to perform a second authentication based on a match between input second authentication information and the registered second authentication information, and
wherein each of the plurality of users is a user for which the input first authentication information is similar to the registered first authentication information, and for which the input second authentication information matches the registered second authentication information.

8. The authentication system according to claim 7, wherein the at least one processor is configured to request, from among the plurality of users, a user determined based on a registration date and time of the second authentication information to change the second authentication information.

9. The authentication system according to claim 7,
wherein the first authentication information is biometric authentication information,
wherein the first authentication is biometric authentication,
wherein the second authentication information is a passcode having a predetermined number of digits,
wherein the second authentication is passcode authentication, and
wherein each of the plurality of users is a user for which the input biometric authentication information is similar to the registered biometric authentication information, and for which the input passcode matches the registered passcode.

10. The authentication system according to claim 6,
wherein the at least one processor is configured to determine whether there is similarity based on a first standard relating to the similarity, and
wherein the at least one processor is configured to determine whether there is similarity based on a second standard that is lower than the first standard.

11. The authentication system according to claim 1,
wherein at least one processor is configured to request, based on a predetermined condition, even when it is determined that there are not the plurality of users, input of a part or all of user information on a user for which the authentication is successful, and
wherein at least one processor is configured to perform the additional authentication based on the input part or all of the user information.

12. The authentication system according to claim 1, wherein the at least one processor is configured to execute, when the authentication and the additional authentication are successful, payment processing based on payment information on a user for which the authentication and the additional authentication are successful.

13. The authentication system of claim 1 further comprising an authentication device, the authentication device comprising at least one second processor; and second computer program code, the second computer program code configured to cause the at least one second processor to:
transmit information required for the authentication; and
execute predetermined processing when the authentication and the additional authentication are successful.

14. An authentication system, comprising at least one processor configured to execute computer program code, the computer program code comprising:
first authentication code configured to cause the at least one processor to perform a first authentication based on similarity between input first authentication information and the registered first authentication information, wherein the first authentication information is biometric face information;
second authentication code configured to cause the at least one processor to perform a second authentication based on a match between input second authentication information and the registered second authentication information, wherein the second authentication information is passcode information;
determination code configured to cause the at least one processor to determine whether there are a plurality of users having the registered first authentication information similar to each other, and having the registered second authentication information matching each other; and
first request code configured to cause the at least one processor to request, from among the plurality of users, a first person, wherein the first person is determined based on a registration date and time of the second authentication information to change the second authentication information,
wherein the plurality of users comprises the first person and a second person, the first person and the second person both using the same first passcode, and responsive to the first person and the second person both using the same first passcode, the at least one processor is further configured to request that the first person update their passcode,
the computer program code further comprising:
second determination code configured to cause the at least one processor to perform repeating a determination comparing first user data of the first person with second user data of the second person until a difference is found, the difference corresponding to specific first user data of the first user; and
second request code configured to cause the at least one processor to perform sending a second request, wherein the second request is based on the difference, and the second request is configured to obtain from the first person the specific first user data to confirm an identity of the first user.

15. An authentication method, comprising:
performing authentication based on input authentication information;
determining, based on the input authentication information, whether there are a plurality of users for which there is a possibility of successful authentication, wherein the input authentication information is biometric face information;
requesting, when it is determined that there are the plurality of users, input of additional authentication information that is based on a difference in user information on each of the plurality of users; and
performing additional authentication based on the input additional authentication information,
wherein the plurality of users comprises a first person and a second person, the difference is found before the performing the additional authentication, and the difference is a difference between first numerical data of the first person and second numerical data of the second person,
the authentication method further comprising repeating a determination comparing first user data of the first person with second user data of the second person until the difference is found, the difference corresponding to specific first user data of the first user; and the request is configured to obtain from the first person the specific first user data to confirm an identity of the first user.

16. The authentication method of claim 15, wherein the first numerical data of the first person is a portion of a telephone number of the first person.

17. A non-transitory computer-readable information storage medium for storing computer program code for execution by a computer, the computer program code comprising:
first authentication code configured to cause the computer to perform authentication based on input authentication information, wherein the input authentication information is biometric face information;
determination code configured to cause the computer to determine, based on the input authentication information, whether there are a plurality of users for which there is a possibility of successful authentication;
requesting code configured to cause the computer to request, when it is determined that there are the plurality of users, input of additional authentication information that is based on a difference in user information on each of the plurality of users; and
additional authentication code configured to cause the computer to perform additional authentication based on the input additional authentication information,
wherein the plurality of users comprises a first person and a second person, the difference is found before the performing the additional authentication, and the difference is a difference between first numerical data of the first person and second numerical data of the second person,
the computer program code further comprising second determination code configured to cause the at least one processor to perform repeating a determination comparing first user data of the first person with second user data of the second person until the difference is found, the difference corresponding to specific first user data of the first user; and the request is configured to obtain from the first person the specific first user data to confirm an identity of the first user.

* * * * *